US007995659B2

(12) United States Patent
Chen et al.

(10) Patent No.: US 7,995,659 B2
(45) Date of Patent: Aug. 9, 2011

(54) PREDICTION MODULE

(75) Inventors: Chih-Chieh Chen, Lu-Chou (TW);
Chih-Hung Li, Yung-Ho (TW);
Wen-Hsiao Peng, O-Mei Hsiang (TW);
Tihao Chiang, Taipei (TW)

(73) Assignee: National Cheng Kung University,
Tainan (TW)

( * ) Notice: Subject to any disclaimer, the term of this patent is extended or adjusted under 35 U.S.C. 154(b) by 1238 days.

(21) Appl. No.: 11/624,959

(22) Filed: Jan. 19, 2007

(65) Prior Publication Data

US 2008/0025411 A1    Jan. 31, 2008

(30) Foreign Application Priority Data

Jul. 31, 2006    (TW) ................................ 95127991 A

(51) Int. Cl.
*H04N 1/00* (2006.01)
*H04B 1/00* (2006.01)
(52) U.S. Cl. ............... 375/240.25; 375/240.12; 375/240
(58) Field of Classification Search .................. None
See application file for complete search history.

(56) References Cited

U.S. PATENT DOCUMENTS 5,598,215 A * 1/1997 Watanabe ................. 348/416.1
5,828,789 A * 10/1998 Yokose et al. ............... 382/239
5,991,449 A * 11/1999 Kimura et al. ............... 382/238
6,137,916 A * 10/2000 Chang et al. ................. 382/250
6,292,587 B1 * 9/2001 Toho .............................. 382/238
6,441,842 B1 * 8/2002 Fandrianto et al. ........ 348/14.13
6,753,917 B2 * 6/2004 Tanizoe et al. ........... 348/333.07
6,842,850 B2 * 1/2005 Ganapathy et al. ........... 712/221
6,975,770 B2 * 12/2005 Kondo et al. ................. 382/238
6,988,184 B2 * 1/2006 Ganapathy et al. ........... 712/213
7,616,811 B2 * 11/2009 Kalevo et al. ................. 382/167
2007/0124187 A1 * 5/2007 Rajput .............................. 705/8
2009/0324089 A1 * 12/2009 Morita ........................... 382/195

* cited by examiner

*Primary Examiner* — Joseph G Ustaris
*Assistant Examiner* — Frederick Bailey
(74) *Attorney, Agent, or Firm* — Christensen O'Connor Johnson Kindness PLLC

(57) ABSTRACT

A prediction module includes a computation control unit and first to sixth processing units. The computation control unit arranges the pixels of a reference block outputted by a frame buffer appropriately according to data decoded by an entropy decoder into first and second pixel signals, and outputs the same to the first to sixth processing units in units of cycles. The processing units are controlled by the computation control unit to respectively complete corresponding computations in a cycle, and to use the computation results as values of first to sixth output signals to be correspondingly outputted in a next cycle. The computation control unit receives the first to sixth output signals, and computes the output signals so as to obtain pixel values of a macroblock to be predicted.

15 Claims, 18 Drawing Sheets

PREDICTION MODULE

CROSS-REFERENCE TO RELATED APPLICATION

This application claims priority of Taiwanese Application No. 095127991, filed on Jul. 31, 2006.

BACKGROUND OF THE INVENTION

1. Field of the Invention

The invention relates to a prediction module, more particularly to a prediction module which is disposed at a decoding end and which conforms to the Motion Picture Expert Group (MPEG) specification.

2. Description of the Related Art

The H.264 encoding standard is a dynamic video compression standard jointly set by the International Tele-communication Union (ITU) and the Motion Picture Expert Group (MPEG) of the International Standard Organization (ISO). Therefore, the standard is also referred to as MPEG-4 Advanced Video Coding (MPEG-4 AVC).

The encoding end samples a dynamic image at a specific sampling frequency into a plurality of static images. Each static image includes a plurality of regions having 16×16 pixels. Each region is compressed into a luminance macroblock and two chrominance macroblocks to represent the luminance and chrominance of the 16×16 region. The two chrominance macroblocks include a Chrominance blue (Cb) macroblock and a Chrominance red (Cr) macroblock.

The luminance macroblock may be, e.g., 16×16 pixels, 16×8 pixels, 8×16 pixels, 8×8 pixels, 8×4 pixels, 4×8 pixels, and 4×4 pixels, according to the size defined according to the standard. The size of the chrominance macroblock is one-fourth of the size of the luminance macroblock, and thus may be 8×8 pixels, 8×4 pixels, 4×8 pixels, 4×4 pixels, 2×4 pixels, 4×2 pixels, and 2×2 pixels.

The encoding end needs to send the static images to the decoding end for image processing at the decoding end. However, the encoding end does not send the static images directly to the decoding end. Instead, pixel values of a plurality of macroblocks included in each static image are first predicted according to a specific sequence and parameters defined by the H.264 standard, with reference to pixels of an encoded reference block. However, since the macroblocks obtained from prediction at the encoding end are not the actual macroblocks in the static image, there is a difference therebetween. Therefore, the encoding end will also calculate a residual value between each actual macroblock and the corresponding macroblock obtained from prediction, and encode the standard syntax correspondingly used for predicting each macroblock and the residual value into a bit-stream, which is sent to the decoding end so as to reduce the amount of data transmitted between the encoding end and the decoding end.

The decoding end decodes the bit stream upon receipt of the same so as to obtain the standard syntax correspondingly used by the encoding end for predicting each macroblock, and the residual value of each macroblock. Then, according to the standard syntax correspondingly used for predicting each macroblock, and by carrying out the same prediction scheme adopted at the encoding end, macroblocks corresponding to those obtained from prediction at the encoding end can be obtained. The actual macroblock can be recovered by adding the corresponding residual value to the macroblock obtained from prediction. Then, the actual macroblocks are grouped together in an appropriate manner to result in the static images, thereby reconstructing the dynamic image.

The decoding end needs to refer to pixels of a decoded reference block at the decoding end when calculating the pixel values of a macroblock to be predicted. The reference block and the macroblock to be predicted may belong to different static images (which is hereinafter referred to as inter prediction) or the same static image (hereinafter referred to as intra prediction).

When the reference block and the macroblock to be predicted belong to the same static image, the reference block includes pixels of predicted macroblocks surrounding the macroblock, the pixels being adjacent to the macroblock to be predicted.

Referring to FIG. 1, the macroblock to be predicted includes 4×4 pixels, and is located in a region surrounded by line segments L1-L4. The coordinates of the pixel at the upper left corner of the macroblock to be predicted are [0,0]. The x-coordinates of the pixels are incremented in a horizontal rightwise direction, and the y-coordinates of the pixels are incremented in a vertical downward direction. The reference block includes pixels Q, h0-h7, and v0-v7 that are located in macroblocks at the upper side, the upper left side, the upper right side, and the left side of the macroblock to be predicted and that are adjacent to the macroblock to be predicted. When a macroblock to be predicted is calculated using intra prediction, the pixels of the macroblock to be predicted are determined by the pixel values of Q, h0-h7, and v0-v7 of the reference block.

When the reference block and the macroblock to be predicted belong to different static images, the reference block includes pixels of one or a plurality of decoded static images. The static image in which the reference block is located is a reference index of the macroblock to be predicted. The size of the reference block is correlated to the motion vector of the macroblock to be predicted. Referring to FIG. 2, the decoding end refers to a reference block when calculating a macroblock to be predicted in a static image F(4). The reference index of the macroblock to be predicted points to a previously decoded static image F(2). The pixel pointed to by the motion vector in the static image F(2) is the pixel at the upper leftmost corner of the macroblock to be predicted.

As shown in FIG. 3, a conventional decoding device at the decoding end includes an entropy decoder 91, an inverse quantizer 92, an inverse discrete cosine transformer 93, an adder 94, a de-blocking filter 95, a frame buffer 96, and a prediction module 97. The prediction module 97 includes an intra predictor 971, an inter predictor 972, and a prediction mode controller 973.

The entropy decoder 91 receives an encoded bit stream from an encoding end (not shown), decodes the bit stream using, e.g., a variable length decoding scheme of the Huffman code, and sends the decoded bit stream to the inverse quantizer 92 and the prediction mode controller 973. The inverse quantizer 92 performs inverse quantization of the decoded bit stream, and sends the bit stream to the inverse discrete cosine transformer 93 for inverse discrete cosine transformation so as to transform data in the frequency domain to data in the spatial domain, and so as to calculate a residual value.

The adder 94 adds up the residual value outputted by the inverse discrete cosine transformer 93 and the macroblock obtained by prediction using the prediction module 97, and sends the result to the de-blocking filter 95. The de-blocking filter 95 subjects the data outputted by the adder 94 to a smoothing de-blocking operation to obtain the actual macroblock in the static image, and outputs the same to the frame buffer 96. The frame buffer 96 stores the macroblocks outputted by the de-blocking filter 95, composes the same into a decoded static image for displaying by an audio-visual medium, and sends the pixel values of the static image to the prediction module 97.

The prediction mode controller 973 obtains the standard syntax used for predicting the macroblock at the encoding end from the decoded bit stream outputted by the entropy decoder 91. The standard syntax includes the motion vector and reference index of each macroblock, as well as the macroblock size and macroblock type. The prediction mode controller 973 sends the decoded bit stream to the intra predictor 971 or the inter predictor 972 according to the standard syntax. The macroblock type includes luminance and chrominance macroblocks.

The intra predictor 971 and the inter predictor 972 calculate the pixel values of the macroblock to be predicted using intra prediction or inter prediction according to the reference block, and sends the calculated macroblock to the adder 94.

When the reference block and the macroblock to be predicted belong to the same static image (intra prediction), the intra predictor 971 can calculate the macroblock to be predicted using different modes according to the type and size of the macroblock to be predicted. For example, when the size of the luminance macroblock to be predicted is 4×4 pixels or 8×8 pixels, the intra predictor 971 can use nine modes of prediction, which are, respectively: mode 0, vertical; mode 1, horizontal; mode 3, diagonal down left; mode 4, diagonal down right; mode 5, vertical left; mode 6, horizontal down; mode 7, vertical right; mode 8, horizontal up; and DC mode.

Since the macroblocks whose pixels the intra predictor 971 needs to refer to when executing intra prediction are macroblocks surrounding the macroblock to be predicted, the intra predictor 971 can store all the pixels that need to be referred to without requiring too large a storage space. Therefore, the frame buffer 96 does not need to send the pixel data to the intra predictor 971, and the intra predictor 971 shown in FIG. 3 does not need to be connected electrically to the frame buffer 96.

When the size of the luminance macroblock to be predicted is 16×16 pixels, the intra predictor 971 can use four modes of prediction, which are, respectively, a vertical mode, a horizontal mode, a DC mode, and a plane mode.

When the macroblock to be predicted is a chrominance macroblock, regardless of the size of the chrominance macroblock to be predicted, the intra predictor 971 can use four modes of prediction, which are, respectively, a vertical mode, a horizontal mode, a DC mode, and a plane mode.

The inter predictor 972 calculates the pixel values of the macroblock to be predicted using inter prediction according to the pixel value of the reference block outputted by the frame buffer 96. The static image outputted by the frame buffer 96 corresponds to the reference index, and the reference block is correlated to the pixel in the static image which the motion vector points to.

Since the reference block only belongs to the same static image as or a different static image than the macroblock to be predicted, the prediction module 97 will calculate the macroblock to be predicted using one of intra prediction and inter prediction. Besides, the macroblocks of each static image have to be processed in sequence, and a next macroblock will not be processed until processing of the current macroblock is finished. Therefore, the prediction module 97 will not use the intra predictor 971 simultaneously with the inter predictor 972 when calculating the macroblock to be predicted, and the conventional prediction module 97 includes both the intra predictor 971 and the inter predictor 972. For example, the prediction module described in the article "A software-hardware co-implementation of MPEG-4 advanced video coding (AVC) decoder with block level pipelining" by S. H. Wang and T. C. et al. in *Journal of VLSI Signal Processing*, 2005, is one with two predictors that are not used simultaneously. As a result, the efficiency of hardware utilization is unsatisfactory.

SUMMARY OF THE INVENTION

Therefore, the object of the present invention is to provide a prediction module that can enhance the efficiency of hardware utilization, and that can perform intra prediction and inter prediction without needing both an intra predictor and an inter predictor.

Accordingly, the prediction module of the present invention is adapted to calculate pixel values of a macroblock to be predicted according to data decoded by an entropy decoder and pixels of a reference block outputted by a frame buffer. The data decoded by the entropy decoder include type and size of the macroblock to be predicted, a static image in which the reference block is located, and a motion vector of the reference block. The prediction module comprises a computation control unit, a first processing unit, a second processing unit, a third processing unit, a fourth processing unit, a fifth processing unit, and a sixth processing unit. The first to sixth processing units output first to sixth output signals, respectively.

The computation control unit is connected electrically to the first to sixth processing units, the frame buffer, and the entropy decoder, receives the pixels of the reference block and the data outputted by the entropy decoder, arranges the pixels of the reference block appropriately according to the data outputted by the entropy decoder into a first pixel signal and a second pixel signal for sequential output in units of cycles, receives the first, second and fourth output signals respectively outputted by the first, second and fourth processing units, and computes the first, second and fourth output signals so as to obtain the pixel values of the macroblock to be predicted.

The sixth processing unit receives the first and second pixel signals, and is controlled by the computation control unit to use one of the first and second pixel signals as the value of the sixth output signal to be outputted thereby in a next cycle.

The fifth processing unit is connected electrically to the sixth processing unit, receives the first and second pixel signals and the sixth output signal, and is controlled by the computation control unit to execute one of the following two operations and to use the operation result as the value of the fifth output signal to be outputted thereby in a next cycle:

the first operation is to multiply one of the first and second pixel signals by an integer value; and the second operation is to multiply one of the first and second pixel signals by an integer value and then add the sixth output signal.

The fourth processing unit is connected electrically to the fifth processing unit, receives the first and second pixel signals and the fifth output signal, and is controlled by the computation control unit to calculate a computation result of multiplying one of the first and second pixel signals by an integer value and then adding the fifth output signal, and to use the computation result as the value of the fourth output signal in a next cycle.

The third processing unit is connected electrically to the fourth processing unit, receives the first and second pixel signals and the fourth output signal, and is controlled by the computation control unit to execute one of the following two operations, and to use the operation result as the value of the third output signal in a next cycle:

the first operation is to multiply one of the first and second pixel signals by an integer value; and the second operation is to multiply one of the first and second pixel signals by an integer value and then add the fourth output signal.

The second processing unit is connected electrically to the third processing unit, receives the first and second pixel signals, the second output signal and the third output signal, and is controlled by the computation control unit to execute one of the following three operations, and to use the operation result as the value of the second output signal in a next cycle:

the first operation is to multiply one of the first and second pixel signals by an integer value and then add the third output signal;

the second operation is to multiply one of the first and second pixel signals by an integer value and then add the second output signal; and the third operation is to output the first pixel signal.

The first processing unit is connected electrically to the second processing unit, receives the value of the first output signal outputted thereby in a previous cycle, the first and second pixel signals, and the second output signal, and is controlled by the computation control unit to execute one of the following two operations and to use the operation result as the value of the first output signal:

the first operation is to multiply one of the first and second pixel signals by an integer value and then add the value of the first output signal in the previous cycle; and the second operation is to multiply one of the first and second pixel signals by an integer value and then add the second output signal.

BRIEF DESCRIPTION OF THE DRAWINGS

Other features and advantages of the present invention will become apparent in the following detailed description of the preferred embodiment with reference to the accompanying drawings, of which:

FIG. 5 is a schematic diagram to illustrate the relationship between the pixel to be predicted and the pixel of the reference block under a mode 0 of intra prediction;

FIG. 6 is a schematic diagram to illustrate the relationship between the pixel to be predicted and the pixel of the reference block under a mode 1 of intra prediction;

DETAILED DESCRIPTION OF THE PREFERRED EMBODIMENT

Figure 4:
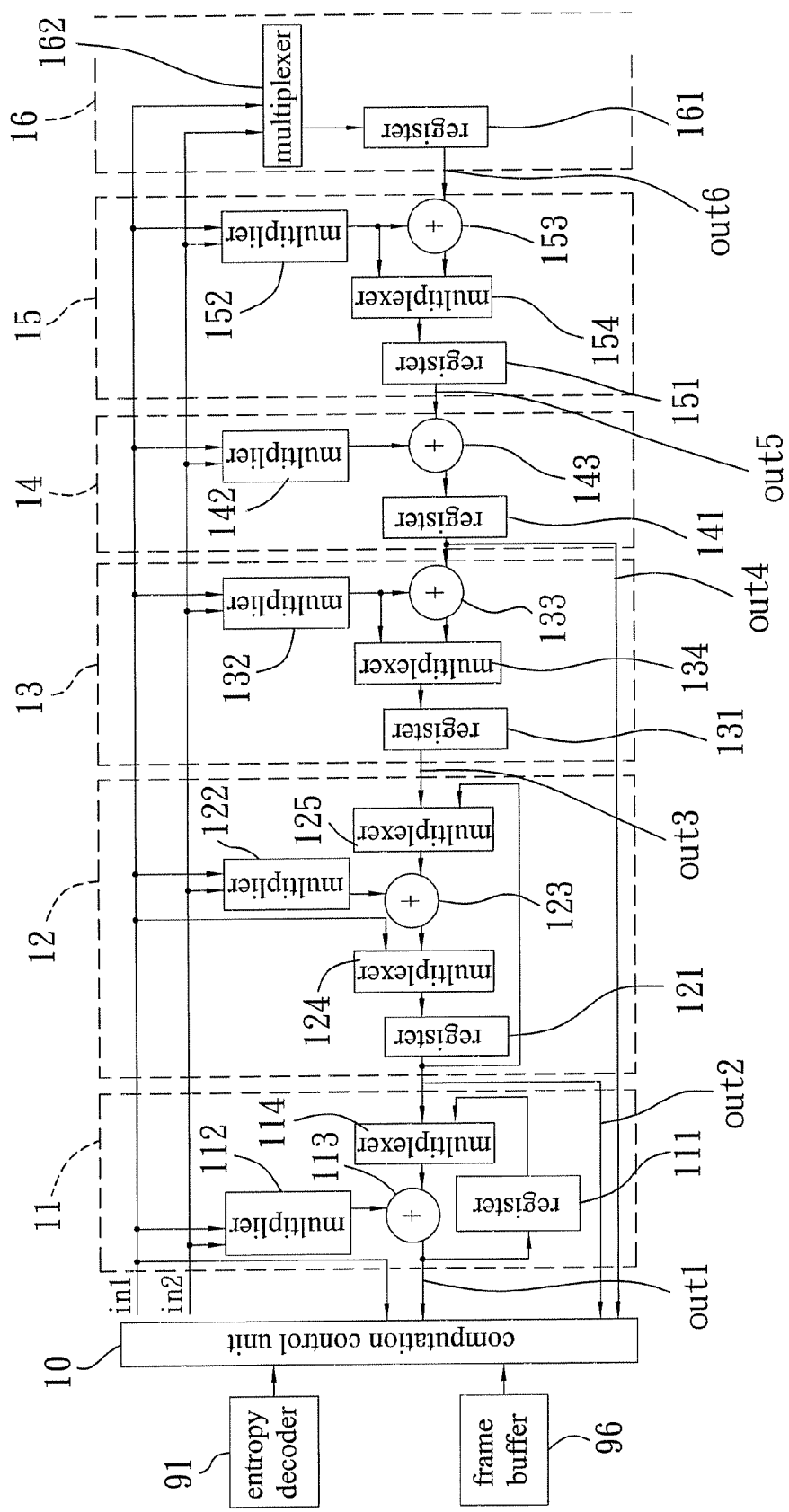
FIG. 4 is a simplified circuit diagram to illustrate the preferred embodiment of a prediction module according to the present invention.

Referring to FIG. 4, the preferred embodiment of a prediction module according to the present invention is adapted for calculating pixel values of a macroblock to be predicted according to data decoded by an entropy decoder 91 and pixels of a reference block outputted by a frame buffer 96, and includes a computation control unit 10, a first processing unit 11, a second processing unit 12, a third processing unit 13, a fourth processing unit 14, a fifth processing unit 15, and a sixth processing unit 16.

The computation control unit 10 is connected electrically to the first, second, third, fourth, fifth, and sixth processing units 11~16, receives the pixels of the reference block and the data outputted by the entropy decoder 91, suitably arranges the pixels of the reference block in sequence according to the data outputted by the entropy decoder 91 into a first pixel signal in1 and a second pixel signal in2, outputs the same to the first, second, third, fourth, fifth, and sixth processing units 11~16 sequentially in units of cycles, receives the first pixel signal in1, and first, second and fourth output signals out1, out2, out4 respectively outputted from the first, second and fourth processing units 11, 12, 14, and adds an integer value to the first, second and fourth output signals out1, out2, out4 and makes a right shift operation thereafter.

The sixth processing unit 16 receives the first pixel signal in1 and the second pixel signal in2, and is controlled by the computation control unit 10 to use one of the first pixel signal in1 and the second pixel signal in2 as the value of a sixth output signal out6 to be outputted thereby during a next cycle.

The fifth processing unit 15 receives the first pixel signal in, the second pixel signal in2, and the sixth output signal out6, and is controlled by the computation control unit 10 to execute one of the two operations set forth below and to use the operation result as the value of a fifth output signal out5 to be outputted thereby during a next cycle.

The first operation is to multiply the first pixel value in1 or the second pixel value in2 by an integer value.

The second operation is to multiply the first pixel signal in1 or the second pixel signal in2 by an integer value, and then add the sixth output signal out6.

The fourth processing unit 14 receives the first pixel signal in, the second pixel signal in2, and the fifth output signal out5, and is controlled by the computation control unit 10 to calculate a computation result of multiplying the first pixel signal in1 or the second pixel value in2 by an integer value and then adding the fifth output signal out5, and to use the computation result as the value of the fourth output signal out4 during a next cycle.

The third processing unit 13 receives the first pixel signal in, the second pixel signal in2, and the fourth output signal out4, and is controlled by the computation control unit 10 to execute one of the two operations set forth below and to use the operation result as the value of a third output signal out3 to be outputted thereby during a next cycle.

The first operation is to multiply the first pixel signal in1 or the second pixel signal in2 by an integer value.

The second operation is to multiply the first pixel signal in1 or the second pixel signal in2 by an integer value, and then add the fourth output signal out4.

The second processing unit 12 receives the second output signal out2, the first pixel signal in, the second pixel signal in2, and the third output signal out3, and is controlled by the computation control unit 10 to execute one of the three operations set forth below, and to use the operation result as the value of the second output signal out2 during a next cycle.

The first operation is to multiply the first pixel signal in1 or the second pixel signal in2 by an integer value and then add the third output signal out3.

The second operation is to multiply the first pixel signal in1 or the second pixel signal in2 by an integer value and then add the second output signal out2.

The third operation is to output the first pixel signal in1.

The first processing unit 11 receives the value of the first output signal out1 outputted thereby in a previous cycle, the first pixel signal in, the second pixel signal in2, and the second output signal out2, and is controlled by the computation control unit 10 to execute one of the two operations set forth below and to use the operation result as the value of the first output signal out1.

The first operation is to multiply the first pixel signal in1 or the second pixel signal in2 by an integer value and then add the value of the first output signal out1 in the previous cycle.

The second operation is to multiply the first pixel signal in1 or the second pixel signal in2 by an integer value and then add the second output signal out2.

The first processing unit 11 includes a register 111, a multiplier 112, an adder 113, and a multiplexer 114. The second processing unit 12 includes a register 121, a multiplier 122, an adder 123, a first multiplexer 124, and a second multiplexer 125.

The third processing unit 13 includes a register 131, a multiplier 132, an adder 133, and a multiplexer 134. The fourth processing unit 14 includes a register 141, a multiplier 142, and an adder 143.

The fifth processing unit 15 includes a register 151, a multiplier 152, an adder 153, and a multiplexer 154.

The sixth processing unit 16 includes a register 161 and a multiplexer 162.

The register 111, 121, 131, 141, 151, 161 of each of the first to sixth processing units 11≠16 has an output end and an input end, and the data at the output end is equivalent to the data at the input end during the previous cycle. Besides, the signals at the output ends of the respective registers 121, 131, 141, 151, 161 of the second to sixth processing units 12~16 are the second to sixth output signals out2, out3, out4, out5, out6, respectively.

The multiplier 112, 122, 132, 142, 152 of each of the first to fifth processing units 11~15 has a first input end, a second input end, and an output end. The first input end and the second input end respectively receive the values of the first pixel signal in1 and the second pixel signal in2 outputted by the computation control unit 10, and the multiplier 112, 122, 132, 142, 152 is controlled by the computation control unit 10 to complete the computation result of multiplying the value at the first input end or the second input end by an integer value within a cycle and to provide the computation result at the output end.

The adder 113, 123, 133, 143, 153 of each of the first to fifth processing units 11~15 has a first input end, a second input end, and an output end, completes the computation result of adding up the values at the first input end and the second input end within a cycle, and provides the sum at the output end.

The multiplexer 114, 124, 125, 134, 154, 162 of each of the processing units 11, 12, 13, 15, 16 has a first input end, a second input end, and an output end, and is controlled by the computation control unit 10 to send the value at one of the input ends thereof to the output end.

The first input end and the second input end of the multiplexer 162 of the sixth processing unit 16 respectively receive the values of the first pixel signal in1 and the second pixel signal in2 outputted by the computation control unit 10, and the output end of the multiplexer 162 is connected electrically to the input end of the register 161.

The output end of the multiplier 152 of the fifth processing unit 15 is connected electrically to the first input end of the adder 153 and the first input end of the multiplexer 154. The second input end of the adder 153 is connected electrically to the output end of the register 161 of the sixth processing unit 16. The output end of the adder 153 is connected electrically to the second input end of the multiplexer 154. The output end of the multiplexer 154 is connected electrically to the input end of the register 151.

The output end of the multiplier 142 of the fourth processing unit 14 is connected electrically to the first input end of the adder 143. The second input end of the adder 143 is connected electrically to the output end of the register 151 of the fifth processing unit 15. The output end of the adder 143 is connected electrically to the input end of the register 141.

The output end of the multiplier 132 of the third processing unit 13 is connected electrically to the first input end of the adder 133 and the first input end of the multiplexer 134. The second input end of the adder 133 is connected electrically to the output end of the register 141 of the fourth processing unit 14. The output end of the adder 133 is connected electrically to the second input end of the multiplexer 134. The output end of the multiplexer 134 is connected electrically to the input end of the register 131.

The output end of the multiplier 122 of the second processing unit 12 is connected electrically to the first input end of the adder 123. The second input end of the adder 123 is connected electrically to the output end of the second multiplexer 125. The output end of the adder 123 is connected electrically to the second input end of the first multiplexer 124. The first input end of the first multiplexer 124 receives the first pixel signal in1 outputted from the computation control unit 10, and the output end of the first multiplexer 124 is connected electrically to the input end of the register 121. The second input end and the first input end of the second multiplexer 125 are connected electrically to the output end of the register 121 and the output end of the register 131 of the third processing unit 13, respectively.

The output end of the multiplier 112 of the first processing unit 11 is connected electrically to the first input end of the adder 113. The second input end of the adder 113 is connected electrically to the output end of the multiplexer 114. The second input end and the first input end of the multiplexer 114 are connected electrically to the output end of the register 111 and the output end of the register 121 of the second processing unit 12, respectively. The output end of the adder 113 is connected electrically to the input end of the register 111 and the computation control unit 10. The signal from the output end of the adder 113 is the first output signal out1.

The data outputted by the entropy decoder 91 include the type and size of the macroblock to be predicted, the static image in which the reference block is located, and motion vectors. When the reference block and the macroblock to be predicted are in the same static image, the computation control unit 10 and the first to sixth processing units 11~16 as a whole use intra prediction to calculate the pixel values to be predicted. On the other hand, when the reference block and the macroblock to be predicted do not belong to the same static image, the computation control unit 10 and the first to sixth processing units 11~16 as a whole use inter prediction to calculate the pixel values to be predicted.

Intra Prediction of 4×4 Luminance Macroblock

Figure 1:
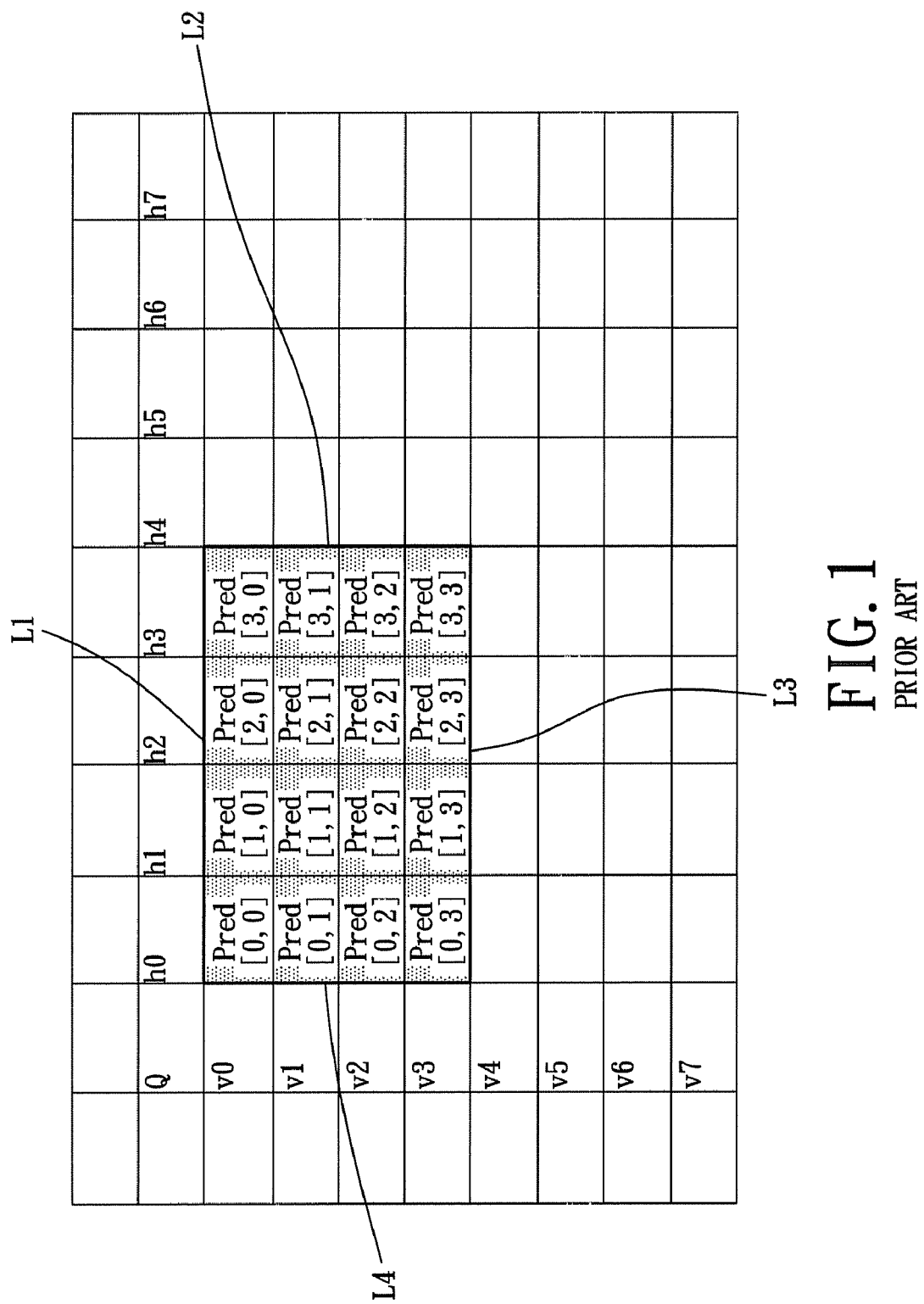
FIG. 1 is a schematic diagram to illustrate the relationship between a reference block and a macroblock to be predicted when intra prediction is used to calculate the macroblock to be predicted.
Figure 2:
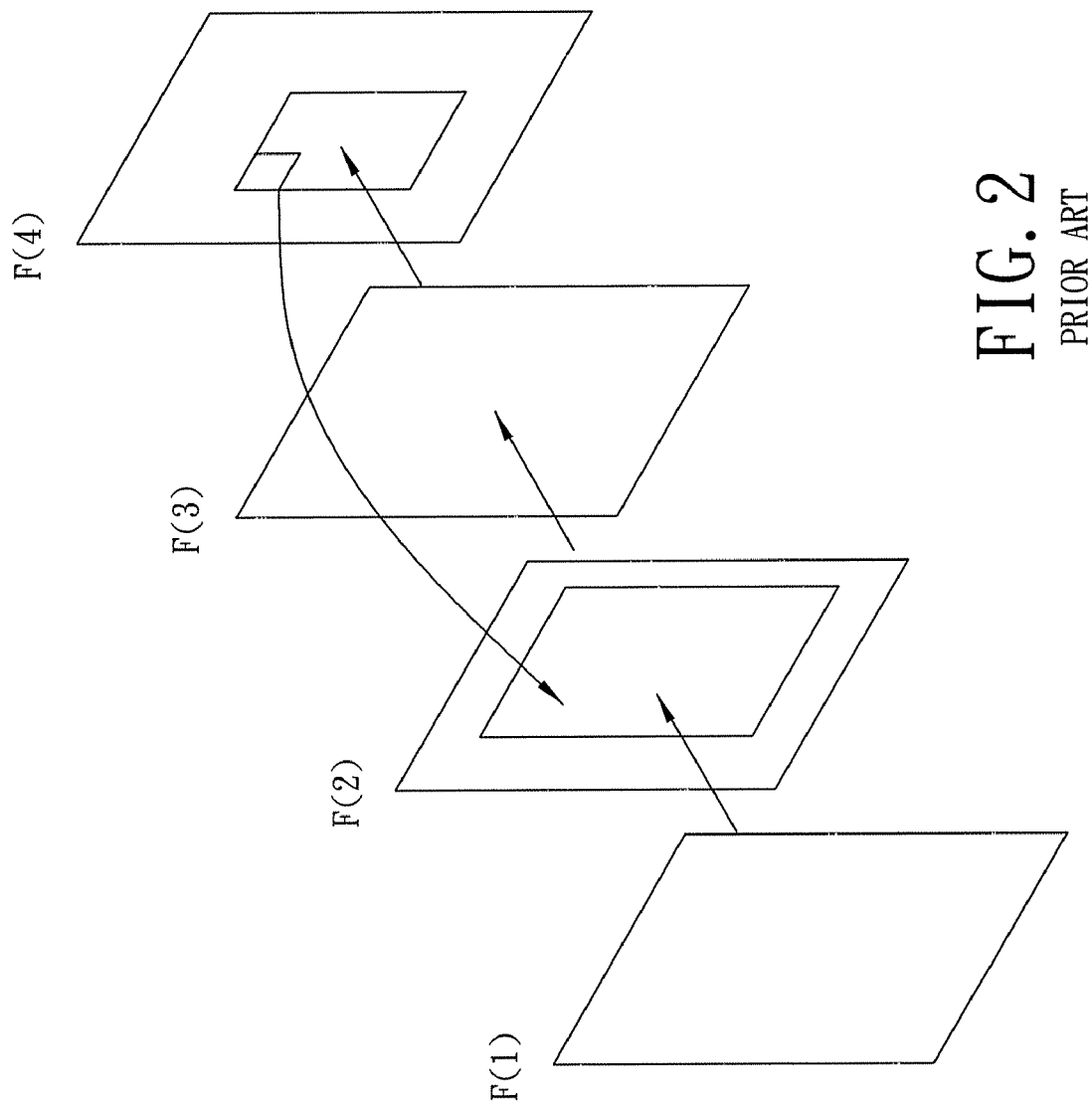
FIG. 2 is a schematic diagram to illustrate the relationship between a reference block and a macroblock to be predicted when inter prediction is used to calculate the macroblock to be predicted.

Referring to FIG. 1, when the macroblock to be predicted is a luminance macroblock, and when intra prediction is used to calculate a 4×4 macroblock to be predicted, since there are nine different modes of intra prediction (modes 0~1, modes 3~8, and DC mode available), the sequencing of pixels Q, h0-h7 and v0-v7 of the reference block by the computation control unit 10, as well as the operation of the components of the first to sixth processing units 11~16 will be described in connection with each of the modes. The equations used for calculating the macroblock to be predicted in each mode are explicitly defined in the H.264 standard.

Intra Prediction of 4×4 Luminance Macroblock (Mode 0)

Referring to FIG. 5, in mode 0 of intra prediction, the value of the pixel h0 is equivalent to the value of the pixel pred[0,j] to be predicted, where j=0~3; the value of the pixel h1 is equivalent to the value of the pixel pred[1,j] to be predicted; the value of the pixel h2 is equivalent to the value of the pixel pred[2,j] to be predicted; and the value of the pixel h3 is equivalent to the value of the pixel pred[3,j] to be predicted.

Therefore, for mode 0 of intra prediction, the computation control unit 10 directly receives data of the first pixel signal in1, and directly uses the received value of the first pixel signal in1 as the value of the pixel to be predicted. In addition, the value of the first pixel signal in1 is set to be equal to the value of the pixel h0 so as to obtain the values of the pixels pred[0,0]~pred[0,3] to be predicted. The value of the first pixel signal in1 is set to be equal to the value of the pixel h1 so as to obtain the values of the pixels pred[1,0]~pred[1,3] to be predicted. The value of the first pixel signal in1 is set to be equal to the value of the pixel h2 so as to obtain the values of the pixels pred[2,0]~pred[2,3] to be predicted. The value of the first pixel signal in1 is set to be equal to the value of the pixel h3 so as to obtain the values of the pixels pred[3,0]~pred[3,3] to be predicted.

Intra Prediction of 4×4 Luminance Macroblock (Mode 1)

Referring to FIG. 6, for mode 1 of intra prediction, the value of the pixel v0 is equal to the value of the pixel pred[i,0] to be predicted, where i=0~3; the value of the pixel v1 is equal to the value of the pixel pred[1,1] to be predicted; the value of the pixel v2 is equal to the value of the pixel pred[1,2] to be predicted; and the value of the pixel v3 is equal to the value of the pixel pred[1,3] to be predicted.

For mode 1, the computation control unit 10 directly receives data of the first pixel signal in1, and directly uses the received value of the first pixel signal in1 as the value of the pixel to be predicted. The value of the first pixel signal in1 is set to be equal to the value of the pixel v0 so as to obtain the values of the pixels pred[0,0]~pred[3,0] to be predicted. The value of the first pixel signal in1 is set to be equal to the value of the pixel v1 so as to obtain the values of the pixels pred[0,1]~pred[3,1] to be predicted. The value of the first pixel signal in1 is set to be equal to the value of the pixel v2 so as to obtain the values of the pixels pred[0,2]~pred[3,2] to be predicted. The value of the first pixel signal in1 is set to be equal to the value of the pixel v3 so as to obtain the values of the pixels pred[0,3]~pred[3,3] to be predicted.

Intra Prediction of 4×4 Luminance Macroblock (Mode 3)

Referring back to FIG. 1, for mode 3 of intra prediction, the relations between the value of the pixel pred[x,y] to be predicted and the pixels h0~h7 of the reference block are expressed in the following equations (3-1)~(3-7), where x=0~3 and y=0~3, and ">>" refers to a logic right shift operation:

$$\mathrm{pred}[0,0]=(h0+2\times h1+h2+2)\!\gg\!2 \qquad \text{equation (3-1)}$$

$$\mathrm{pred}[1,0]=\mathrm{pred}[0,1]=(h1+2\times h2+h3+2)\!\gg\!2 \qquad \text{equation (3-2)}$$

$$\mathrm{pred}[2,0]=\mathrm{pred}[1,1]=\mathrm{pred}[0,2]=(h2+2\times h3+h4+2)\!\gg\!2 \qquad \text{equation (3-3)}$$

$$\mathrm{pred}[3,0]=\mathrm{pred}[2,1]=\mathrm{pred}[1,2]=\mathrm{pred}[0,3]=(h3+2\times h4+h5+2)\!\gg\!2 \qquad \text{equation (3-4)}$$

$$\mathrm{pred}[3,1]=\mathrm{pred}[2,2]=\mathrm{pred}[1,3]=(h4+2\times h5+h6+2)\!\gg\!2 \qquad \text{equation (3-5)}$$

$$\mathrm{pred}[3,2]=\mathrm{pred}[2,3]=(h5+2\times h6+h7+2)\!\gg\!2 \qquad \text{equation (3-6)}$$

$$\mathrm{pred}[3,3]=(h6+3\times h7)\!\gg\!2 \qquad \text{equation (3-7)}$$

Figure 7:
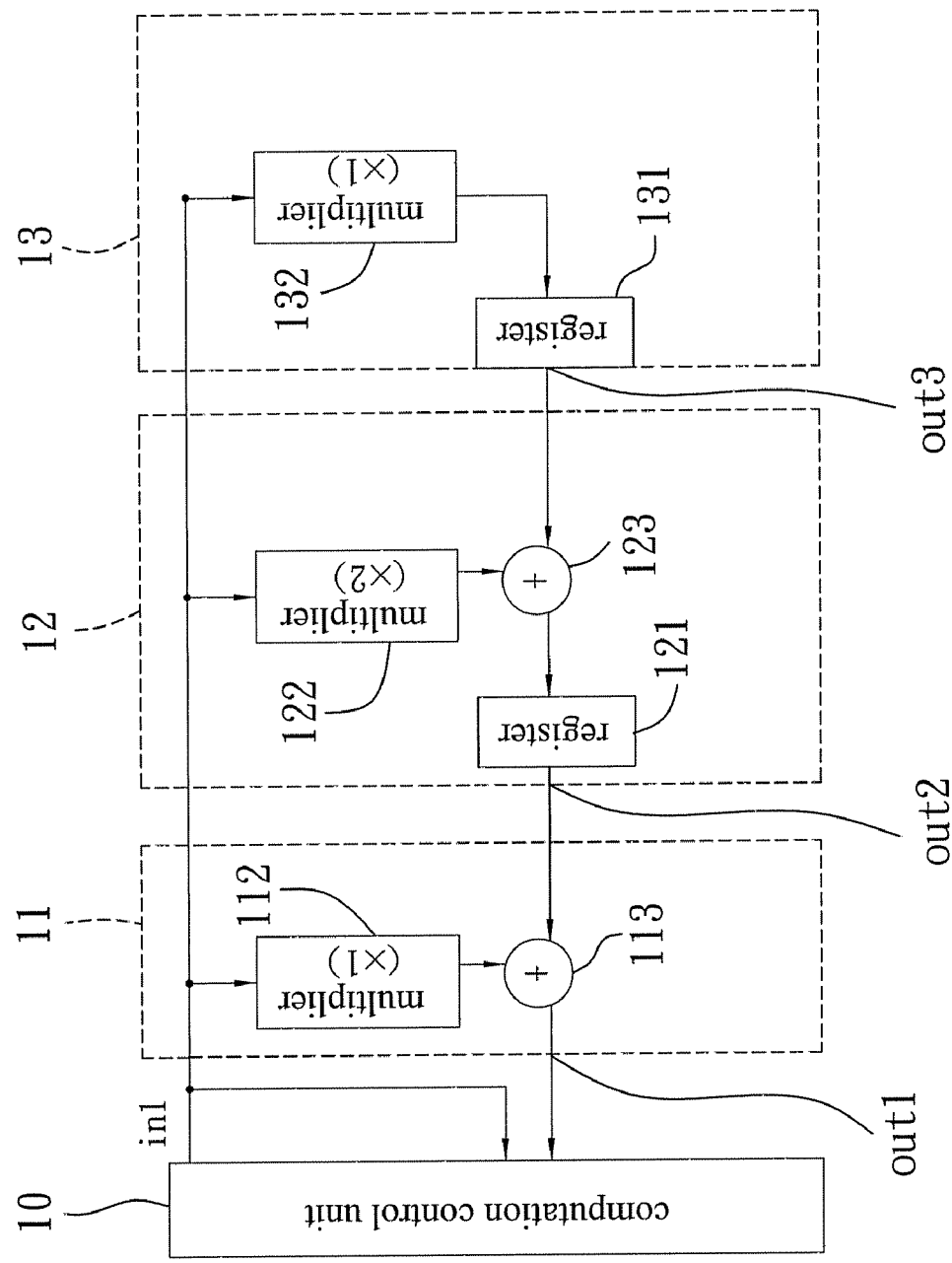
FIG. 7 is a simplified circuit diagram to illustrate the connective relationship among components of a computation control unit, a first processing unit, a second processing unit, and a third processing unit under a mode 3 of intra prediction.

Referring to both FIG. 4 and FIG. 7, for mode 3 of intra prediction, the computation control unit 10 sets the multiplexer 134 of the third processing unit 13 to send the data at the first input end thereof to the output end thereof, further sets the first multiplexer 124 of the second processing unit 12 to send the data at the second input end thereof to the output end thereof, and further sets the second multiplexer 125 of the second processing unit 12 to send the data at the first input end thereof to the output end thereof. The computation control unit 10 also sets the multiplexer 114 of the first processing unit 11 to send the data at the first input end thereof to the output end thereof. Therefore, the computation control unit 10 and the circuits of the first to sixth processing units 11~16 can be simplified in a manner as shown in FIG. 7.

The computation control unit 10 also sets the multipliers 112, 122, 132 of the first processing unit 11, the second processing unit 12, and the third processing unit 13 to receive the data of the first pixel signal in, and to multiply the data of the first pixel signal in1 by 1, 2, and 1, respectively.

Referring to FIG. 7 and Table 1, the computation control unit 10 arranges the pixels h0~h7 in an order as shown in Table 1, and the pixels h0~h7 are outputted in sequence to the first, second and third processing units 11, 12, 13 during the first to ninth cycles.

TABLE 1

| cycle | in1 | out3 | out2 | out1 |
|---|---|---|---|---|
| 1 | h0 | — | — | h0 |
| 2 | h1 | h0 | 2 × h0 | h1 + 2 × h0 |
| 3 | h2 | h1 | 2 × h1 + h0 | h2 + 2 × h1 + h0 |
| 4 | h3 | h2 | 2 × h2 + h1 | h3 + 2 × h2 + h1 |
| 5 | h4 | h3 | 2 × h3 + h2 | h4 + 2 × h3 + h2 |
| 6 | h5 | h4 | 2 × h4 + h3 | h5 + 2 × h4 + h3 |
| 7 | h6 | h5 | 2 × h5 + h4 | h6 + 2 × h5 + h4 |
| 8 | h7 | h6 | 2 × h6 + h5 | h7 + 2 × h6 + h5 |
| 9 | h7 | h7 | 2 × h7 + h6 | h7 + 2 × h7 + h6 |

During the first cycle, the computation control unit 10 sends the pixel h0 to the multipliers 112, 122, 132 of the first to third processing units 11, 12, 13. The multipliers 112, 122, 132 multiply the pixel h0 by 1, 2, and 1, respectively. Therefore, the value of the first output signal out1 is h0, and the registers 121, 131 of the second and third processing units 12, 13 respectively store the values 2×h0 and h0 therein to be outputted during the next cycle. Thus, the second and the third processing units 12, 13 do not output any signal at this time.

During the second cycle, the computation control unit 10 sends the pixel h1 to the multipliers 112, 122, 132 of the first to third processing units 11, 12, 13. The second and third output signals out2, out3 are data temporarily stored in the registers 121, 131 of the second and third processing units 12, 13 during the previous cycle, and are, therefore, 2×h0 and h0. The data inputted into the registers 121, 131 of the second and third processing units 12, 13 during the second cycle are 2×h1+h0 and h1, respectively.

During the third cycle, the computation control unit 10 sends the pixel h2 to the multipliers 112, 122, 132 of the first to third processing units 11, 12, 13. The value of the second output signal out2 is 2×h1+h0, and is sent to the second input end of the adder 113 of the first processing unit 11. The data at the first input end of the adder 113 of the first processing unit 11 is h2. Therefore, the value of the first output signal out1 is equal to h2+2×h1+h0. The computation control unit 10 receives the first output signal out1 which, after adding 2 and making a logic right shift of 2 bits, is equal to the value of the pixel pred[0,0] to be predicted in the equation (3-1). At this time, the data temporarily stored in the register 121 of the second processing unit 12 is 2×h2+h1.

During the fourth cycle, the first pixel signal in1 of the computation control unit 10 is equal to the value of the pixel h3. At this time, since the value of the second output signal out2 is equal to 2×h2+h1, and is sent to the second input end of the adder 113 of the first processing unit 11, and the first input end of the adder 113 of the first processing unit 11 is equal to h3, the value of the first output signal out1 is equal to h3+2×h2+h1. After the computation control unit 10 adds 2 to the first output signal out1 and makes a right shift of 2 bits, the value of the first output signal out1 will be equal to the value of the pixels to be predicted pred[1,0] and pred[0 μl] in the equation (3-2).

In the same manner, the first to third processing units 11, 12, 13 and the computation control unit 10 can calculate the values of the pixels to be predicted pred[2, 0], pred[3,0], pred[3,1], pred[3,2], and pred[3,3] in the corresponding equations (3-3) to (3-7) in sequence during the following fifth to ninth cycles, as shown in Table 1.

Intra Prediction of 4×4 Luminance Macroblock (Mode 4)

Referring back to FIG. 1, for mode 4 of intra prediction, the relations between the value of the pixel pred[x,y] to be predicted and the pixels Q, h0~h3 and v0~v3 of the reference block are expressed in the following equations (4-1) to (4-7):

$$\text{pred}[0,3]=(v3+2\times v2+v1+2)>>2 \quad \text{equation (4-1)}$$

$$\text{pred}[0,2]=\text{pred}[1,3]=(v2+2\times v1+v0+2)>>2 \quad \text{equation (4-2)}$$

$$\text{pred}[0,1]=\text{pred}[1,2]=\text{pred}[2,3]=(v1+2\times v0+Q+2)>>2 \quad \text{equation (4-3)}$$

$$\text{pred}[0,0]=\text{pred}[1,1]=\text{pred}[2,2]=\text{pred}[3,3](v0+2\times Q+h0+2)>>2 \quad \text{equation (4-4)}$$

$$\text{pred}[1,0]=\text{pred}[2,1]=\text{pred}[3,2]=(Q+2\times h0+h1+2)>>2 \quad \text{equation (4-5)}$$

$$\text{pred}[2,0]=\text{pred}[3,1]=(h0+2\times h1+h2+2)>>2 \quad \text{equation (4-6)}$$

$$\text{pred}[3,0]=(h1+2\times h2+h3)>>2 \quad \text{equation (4-7)}$$

The computation control unit 10 sets the first to third processing units 11, 12, 13 to have the same manner of connection as in mode 3, and further sets the multipliers 112, 122, 132 of the first to third processing units 11, 12, 13 to multiply the first pixel signal in1 of the computation control unit 10 by 1, 2 and 1, respectively. The computation control unit 10 also arranges the pixels Q, h0~h3 and v0~v3 of the reference block in an order as shown in Table 2, which are outputted thereby in sequence as the respective values of the first pixel signal in1 during the first to ninth cycles. The computation control unit 10 receives the first output signal out1 during the third to ninth cycles, adds 2 thereto, and makes a logic right shift of 2 bits to obtain the pixels to be predicted in the corresponding equations (4-1)~(4-7).

TABLE 2

| cycle | in1 | out3 | out2 | out1 |
|---|---|---|---|---|
| 1 | v3 | — | — | v3 |
| 2 | v2 | v3 | 2 × v3 | v2 |
| 3 | v1 | v2 | 2 × v2 + v1 | v3 + 2 × v2 + v1 |
| 4 | v0 | v1 | 2 × v1 + v0 | v2 + 2 × v1 + v0 |
| 5 | Q | v0 | 2 × v0 + Q | v1 + 2 × v0 + Q |
| 6 | h0 | Q | 2 × Q + h0 | v0 + 2 × Q + h0 |
| 7 | h1 | h0 | 2 × h0 + h1 | Q + 2 × h0 + h1 |
| 8 | h2 | h1 | 2 × h1 + h2 | h0 + 2 × h1 + h2 |
| 9 | h3 | h2 | 2 × h3 + h3 | h1 + 2 × h2 + h3 |

Intra Prediction of 4×4 Luminance Macroblock (Mode 5)

Referring back to FIG. 1, for mode 5 of intra prediction, the relations between the value of the pixel pred[x,y] to be predicted and the pixels h0~h6 of the reference block are expressed in the following equations (5-1) to (5-10):

$$\text{pred}[0,1]=(h0+2\times h1+h2+2)>>2 \quad \text{equation (5-1)}$$

$$\text{pred}[1,1]=\text{pred}[0,3]=(h1+2\times h2+h3+2)>>2 \quad \text{equation (5-2)}$$

$$\text{pred}[2,1]=\text{pred}[1,3]=(h2+2\times h3+h4+2)>>2 \quad \text{equation (5-3)}$$

$$\text{pred}[3,1]=\text{pred}[2,3]=(h3+2\times h4+h5+2)>>2 \quad \text{equation (5-4)}$$

$$\text{pred}[3,3]=(h4+2\times h5+h6+2)>>2 \quad \text{equation (5-5)}$$

$$\text{pred}[3,2]=(h4+h5+1)>>1 \quad \text{equation (5-6)}$$

$$\text{pred}[3,0]=\text{pred}[2,2]=(h3+h4+1)>>1 \quad \text{equation (5-7)}$$

$$\text{pred}[2,0]=\text{pred}[1,2]=(h2+h3+1)>>1 \quad \text{equation (5-8)}$$

$$\text{pred}[1,0]=\text{pred}[0,2]=(h1+h2+1)>>1 \quad \text{equation (5-9)}$$

$$\text{pred}[0,0]=(h1+h0+1)>>1 \quad \text{equation (5-10)}$$

During the first to seventh cycles, the computation control unit 10 sets the first to third processing units 11, 12, 13 to have the same manner of connection as in mode 3, further sets the multipliers 112, 122, 132 of the first to third processing units 11, 12, 13 to multiply the first pixel signal in1 of the computation control unit 10 by 1, 2 and 1, respectively, arranges the pixels h0~h6 of the reference block in an order as shown in Table 3, and outputs the same in sequence as the respective values of the first pixel signal in1 during the first to seventh cycles. The computation control unit 10 receives the first output signal out1 during the third to seventh cycles, adds 2 thereto, and makes a logic right shift of 2 bits to obtain the pixels to be predicted in the corresponding equations (5-1) to (5-5).

TABLE 3

| cycle | in1 | out3 | out2 | out1 |
|---|---|---|---|---|
| 1 | h0 | — | — | h1 |
| 2 | h1 | h0 | 2 × h0 | h0 |
| 3 | h2 | h1 | 2 × h1 + h0 | h2 + 2 × h1 + h0 |
| 4 | h3 | h2 | 2 × h2 + h1 | h3 + 2 × h2 + h1 |
| 5 | h4 | h3 | 2 × h3 + h2 | h4 + 2 × h3 + h2 |
| 6 | h5 | h4 | 2 × h4 + h3 | h5 + 2 × h4 + h3 |
| 7 | h6 | h5 | 2 × h5 + h4 | h6 + 2 × h5 + h4 |
| 8 | h5 | — | — | — |
| 9 | h4 | — | h5 | h5 + h4 |
| 10 | h3 | — | h4 | h4 + h3 |
| 11 | h2 | — | h3 | h3 + h2 |
| 12 | h1 | — | h2 | h2 + h1 |
| 13 | h0 | — | h1 | h1 + h0 |

Figure 8:
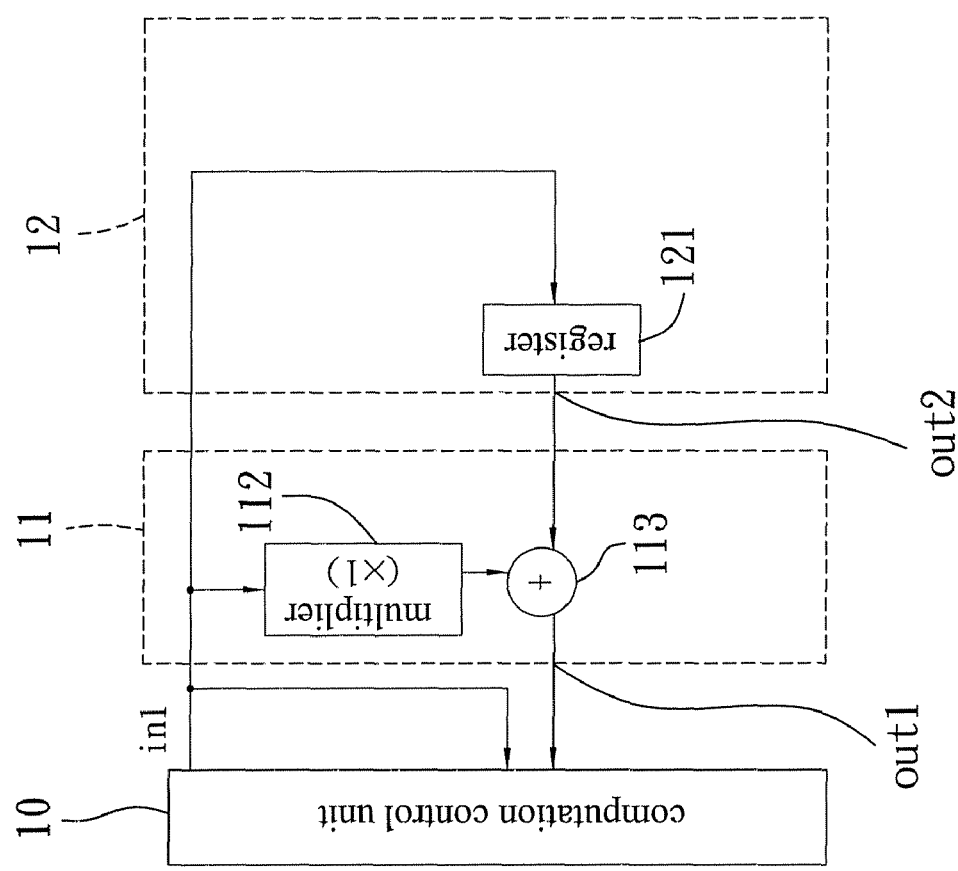
FIG. 8 is a simplified circuit diagram to illustrate the connective relationship among the components of the computation control unit, the first processing unit, and the second processing unit under a mode 5 of intra prediction.

Referring to FIGS. 4 and 8, since only two pixels of the reference block are needed for calculating the pixels to be predicted from equations (5-6) to (5-10), the computation control unit 10 sets the first multiplexer 124 of the second processing unit 12 to send the data at the first input end thereof to the output end thereof during the eighth to thirteenth cycles, and further sets the multiplexer 114 of the first processing unit 11 to send the data at the first input end thereof to the output end thereof during the same cycles. Therefore, the connective relationship among the computation control unit 10 and the first and second processing units 11, 12 can be simplified in a manner as shown in FIG. 8.

As shown in Table 3, the computation control unit 10 also uses the pixels h5~h0 as the values of the first pixel signal in1 during the eighth to thirteen cycles. Therefore, the first output signal out1 and the second output signal out2 are as shown in Table 3. During the ninth to thirteenth cycles, the computation control unit 10 adds 1 to the value of the first output signal out1 and makes a logic right shift of 2 bits to obtain the pixel to be predicted in the corresponding equations (5-6) to (5-10).

The computation control unit 10 will not use the value of the first output signal out1 in the eighth cycle.

Intra Prediction of 4×4 Luminance Macroblock (Mode 6)

Referring back to FIG. 1, for mode 6 of intra prediction, the relations between the value of the pixel pred[x,y] to be predicted and the pixels Q, h0~h3 and v0~v3 of the reference block are expressed in the following equations (6-1) to (6-10):

$$\text{pred}[0,0]=\text{pred}[2,1]=(Q+v0+1)>>1 \quad \text{equation (6-1)}$$

$$\text{pred}[0,1]=\text{pred}[2,2]=(v0+v1+1)>>1 \quad \text{equation (6-2)}$$

$$\text{pred}[0,2]=\text{pred}[2,3]=(v1+v2+1)>>1 \quad \text{equation (6-3)}$$

$$\text{pred}[0,3]=(v2+v3+1)>>1 \quad \text{equation (6-4)}$$

$$\text{pred}[1,3]=(v3+2\times v2+v1+2)>>2 \quad \text{equation (6-5)}$$

$$\text{pred}[1,2]=\text{pred}[3,3]=(v2+2\times v1+v0+2)>>2 \quad \text{equation (6-6)}$$

$$\text{pred}[1,1]=\text{pred}[3,2]=(v1+2\times v0+Q+2)>>2 \quad \text{equation (6-7)}$$

$$\text{pred}[1,0]=\text{pred}[3,1]=(v0+2\times Q+h0+2)>>2 \quad \text{equation (6-8)}$$

$$\text{pred}[2,0]=(Q+2\times h0+h+2)>>2 \quad \text{equation (6-9)}$$

$$\text{pred}[3,0]=(h0+2\times h1+h2+2)>>2 \quad \text{equation (6-10)}$$

Referring to Table 4, the computation control unit 10 arranges the pixels Q, h0~h2 and v0~v3 in an order as shown therein for output during the first to twelfth cycles, and controls the first, second and third processing units 11, 12, 13 such that the first, second and third processing units 11, 12, 13 correspond to the manner of connection shown in FIG. 8 when in the first to fourth cycles, and to the manner of connection shown in FIG. 7 when in the fifth to twelfth cycles. It is noted that the computation control unit 10 does not use the value of the first output signal out1 in the sixth cycle. The computation control unit 10 adds 1 to the value of the first output signal out1 during the second to fifth cycles, and makes a logic right shift of 1 bit to obtain the pixel to be predicted in the corresponding equations (6-1) to (6-4). The computation control unit 10 adds 2 to the value of the first output signal out1 during the seventh to twelfth cycles, and makes a logic right shift of 2 bits to obtain the pixel to be predicted in the corresponding equations (6-5) to (6-10).

TABLE 4

| cycle | in1 | out3 | out2 | out1 |
|---|---|---|---|---|
| 1 | Q | — | — | Q |
| 2 | v0 | — | Q | Q + v0 |
| 3 | v1 | — | v0 | v0 + v1 |
| 4 | v2 | — | v1 | v2 + v1 |
| 5 | v3 | — | v2 | v3 + v2 |
| 6 | v2 | v3 | 2 × v3 | 2 × v3 + v2 |
| 7 | v1 | v2 | 2 × v2 + v3 | v3 + 2 × v2 + v1 |
| 8 | v0 | v1 | 2 × v1 + v1 | v2 + 2 × v1 + v0 |
| 9 | Q | v0 | 2 × v0 + Q | v1 + 2 × v0 + Q |
| 10 | h0 | Q | 2 × Q + h0 | v0 + 2 × Q + h0 |
| 11 | h1 | h0 | 2 × h0 + h1 | Q + 2 × h0 + h1 |
| 12 | h2 | h1 | 2 × h1 + h2 | h0 + 2 × h1 + h2 |

Intra Prediction of 4×4 Luminance Macroblock (Mode 7)

Referring back to FIG. 1, for mode 7 of intra prediction, the relations between the value of the pixel pred[x,y] to be predicted and the pixels Q, h0~h2 and v0~v3 of the reference block are expressed in the following equations (7-1)~(7-10):

$$\text{pred}[0,0]=\text{pred}[1,2]=(Q+h+1)>>1 \quad \text{equation (7-1)}$$

$$\text{pred}[1,0]=\text{pred}[2,2]=(h0+h1+1)>>1 \quad \text{equation (7-2)}$$

$$\text{pred}[2,0]=\text{pred}[3,2]=(h1+h2+1)>>1 \quad \text{equation (7-3)}$$

$$\text{pred}[3,0]=(h2+h3+1)>>1 \quad \text{equation (7-4)}$$

$$\text{pred}[3,1]=(h1+2\times h2+h3+2)>>2 \quad \text{equation (7-5)}$$

$$\text{pred}[2,1]=\text{pred}[3,3]=(h0+2\times h1+h2+2)>>2 \quad \text{equation (7-6)}$$

$$\text{pred}[1,1]=\text{pred}[2,3]=(Q+2\times h0+h1+2)>>2 \quad \text{equation (7-7)}$$

$$\text{pred}[0,1]=\text{pred}[1,3]=(v0+2\times Q+h0+2)>>2 \quad \text{equation (7-8)}$$

$$\text{pred}[0,2]=(v1+2\times v0+Q+2)>>2 \quad \text{equation (7-9)}$$

$$\text{pred}[0,3]=(v2+2\times v1+v0+2)>>2 \quad \text{equation (7-10)}$$

Referring to Table 5, the computation control unit 10 arranges the pixels Q, h0~h2 and v0~v3 in an order as shown therein for output during the first to twelfth cycles, and controls the first, second and third processing units 11, 12, 13 such that the processing units 11, 12, 13, correspond to the manner of connection shown in FIG. 8 during the first to fourth cycles, and to the manner of connection shown in FIG. 7 during the fifth to twelfth cycles. It is noted that the computation control unit 10 does not use the value of the first output signal out1 in the sixth cycle. The computation control unit 10 adds 1 to the value of the first output signal out1 during the second to fifth cycles, and makes a logic right shift of one bit to obtain the pixels to be predicted in the corresponding equations (7-1) to (7-4). The computation control unit 10 adds 2 to the value of the first output signal out1 during the seventh to twelfth cycles, and makes a logic right shift of 2 bits to obtain the pixels to be predicted in the corresponding equations (7-5) to (7-10).

TABLE 5

| Cycle | In1 | Out3 | Out2 | Out1 |
|---|---|---|---|---|
| 1 | Q | — | — | Q |
| 2 | h0 | — | Q | Q + h0 |
| 3 | h1 | — | h0 | h0 + h1 |
| 4 | h2 | — | h1 | h2 + h1 |
| 5 | h3 | — | h2 | h3 + h2 |
| 6 | h2 | h3 | 2 × h3 | 2 × h3 + h2 |
| 7 | h1 | h2 | 2 × h2 + h3 | h3 + 2 × h2 + h1 |
| 8 | h0 | h1 | 2 × h1 + h1 | h2 + 2 × h1 + h0 |
| 9 | Q | h0 | 2 × h0 + Q | h1 + 2 × h0 + Q |
| 10 | v0 | Q | 2 × Q + v0 | h0 + 2 × Q + v0 |
| 11 | v1 | v0 | 2 × v0 + v1 | Q + 2 × v0 + v1 |
| 12 | v2 | v1 | 2 × v1 + v2 | v0 + 2 × v1 + v2 |

Intra Prediction of 4×4 Luminance Macroblock (Mode 8)

Referring back to FIG. 1, for mode 8 of intra prediction, the relations between the value of the pixel pred[x,y] to be predicted and the pixels Q, h0~h3 and v0~v3 of the reference block are expressed in the following equations (8-1) to (8-7):

$$\text{pred}[1,0]=(v0+2\times v1+v2+2)>>2 \quad \text{equation (8-1)}$$

$$\text{pred}[1,1]=\text{pred}[3,0]=(v1+2\times v2+v3+2)>>2 \quad \text{equation (8-2)}$$

$$\text{pred}[1,2]=\text{pred}[3,1]=(v2+3\times v3+2)>>2 \quad \text{equation (8-3)}$$

$$\text{pred}[2,2]=\text{pred}[3,2]=\text{pred}[0,3]=\text{pred}[1,3]=\text{pred}[2,3]=\text{pred}[3,3]=v3 \quad \text{equation (8-4)}$$

$$\text{pred}[0,2]=\text{pred}[2,1]=(v2+v3+1)>>1 \quad \text{equation (8-5)}$$

$$\text{pred}[0,1]=\text{pred}[2,0]=(v1+v2+1)>>1 \quad \text{equation (8-6)}$$

$$\text{pred}[0,0]=(v0+v1+1)>>1 \quad \text{equation (8-7)}$$

Referring to Table 6, the computation control unit 10 arranges the pixels v0~v3 in the manner as shown therein for output during the first to ninth cycles, and controls the first, second and third processing units 11, 12, 13 such that the processing units 11, 12, 13 correspond to the manner of connection shown in FIG. 7 during the first to fifth cycles, and correspond to the manner of connection shown in FIG. 8 during the sixth to ninth cycles. The computation control unit 10 adds 2 to the value of the first output signal out1 during the third to fifth cycles, and makes a logic right shift of 2 bits to obtain the pixels to be predicted in the corresponding equations (8-1) to (8-3). The computation control unit 10 adds 1 to the value of the first output signal out1 in the seventh to ninth cycles, and makes a logic right shift of 1 bit to obtain the pixels to be predicted in the corresponding equations (8-5) to (8-7).

It is noted that since the computation control unit 10 also receives the first pixel signal in1 outputted thereby, the computation control unit 10 uses the pixel v3 as the value of the first pixel signal in1 during the sixth cycle. In particular, the computation control unit 10 calculates the pixel value to be predicted without using the value of the first output signal out1, but instead uses the value of the first pixel signal in1 directly as the value of the pixel to be predicted in equation (8-4).

TABLE 6

| cycle | in1 | out3 | out2 | out1 |
|---|---|---|---|---|
| 1 | v0 | — | — | V0 |
| 2 | v1 | v0 | 2 × v0 | 2 × v0 + v1 |
| 3 | v2 | v1 | 2 × v1 + v0 | v2 + 2 × v1 + v0 |
| 4 | v3 | v2 | 2 × v2 + v1 | v3 + 2 × v2 + v1 |
| 5 | v3 | v3 | 2 × v3 + v2 | v3 + 2 × v3 + v2 |
| 6 | v3 | — | — | — |
| 7 | v2 | — | v3 | v3 + v2 |
| 8 | v1 | — | v2 | v2 + v1 |
| 9 | v0 | — | v1 | v1 + v0 |

Intra Prediction of 4×4 Luminance Macroblock (Dc Mode)

Referring back to FIG. 1, for the DC mode of intra prediction, all the pixel values pred[x,y] of a macroblock to be predicted are identical. If there are macroblocks at the upper side and the left side of the macroblock to be predicted, the relation between the value of the pixel pred[x,y] to be predicted and the pixels h0~h7 and v0~v3 is expressed in the following equation (9-1), where x=0~3 and y=0~3:

$$\text{pred}[x,y]=(h0+h1+h2+h3+v0+v1+v2+v3+4)>>3 \quad \text{equation (9-1)}$$

If the pixels h0~h7 do not exist and the pixels v0~v3 exist, the relation between the value of the pixel pred[x,y] to be predicted and the pixels v0~v3 is expressed in the following equation (9-2):

$$\text{pred}[x,y]=(v0+v1+v2+v3+2)>>2 \quad \text{equation (9-2)}$$

If the pixels v0~v3 do not exist and the pixels h0~h3 exist, the relation between the value of the pixel pred[x,y] to be predicted and the pixels h~h3 is expressed in the following equation (9-3):

$$\text{pred}[x,y]=(h0+h1+h2+h3+2)>>2 \quad \text{equation (9-3)}$$

If none of pixels h0~h7 and v0~v7 are present, the pixel pred[x,y] to be predicted is 128.

Figure 9:
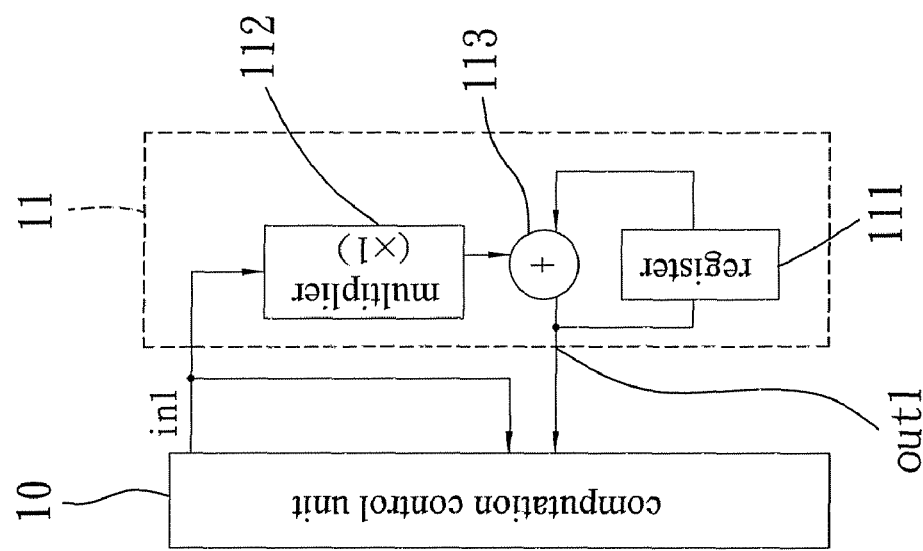
FIG. 9 is a simplified circuit diagram to illustrate the connective relationship among the components of the computation control unit and the first processing unit under a DC mode of intra prediction.

Referring to FIG. 4 and FIG. 9, when the computation control unit 10 calculates the pixel to be predicted using the DC mode of intra prediction, the computation control unit 10 sets the multiplexer 114 of the first processing unit 11 to output the data at the second input end thereof to the output end thereof, and further sets the multiplier 112 of the first processing unit 11 to multiply the first pixel signal in1 of the computation control unit 10 by 1 and send the result to the output end thereof. Therefore, the connective relationship between the processing units 11, 12, 13, 14, 15, 16 and the computation control unit 10 can be simplified in a manner as shown in FIG. 9.

The computation control unit 10 uses the pixel h0 as the first pixel signal in1 in the first cycle, which becomes the first output signal out1 after being subjected to computation via the multiplier 112 and the adder 113 of the first processing unit 11. During the second cycle, the computation control unit 10 uses the pixel h1 as the first pixel signal in, and sends the same through the multiplier 112 of the first processing unit 11 to the first input end of the adder 113 of the first processing unit 11. At this time, the data at the second input end of the adder 113 of the first processing unit 11 is the data at the output end of the register 11 of the first processing unit 11, and is equal to the value of the first output signal out1 in the first cycle and is equal to h0. Therefore, the data at the output end of the adder 113 of the first processing unit 11 is h0+h1. In the same manner, the computation control unit 10 will use the pixels h2, h3, v0~v3 sequentially as the value of the first pixel signal in1 in each of the subsequent cycles. When the computation control unit 10 outputs the pixel v3, the data at the second input end of the adder 113 of the first processing unit 11 will be equal to h0+h1+h2+h3+v0+v1+v2. Therefore, the first output signal out1 is equal to h0+h1+h2+h3+v0+v1+v2+v3. It is known from equation (9-1) that the computation control unit 10 can obtain the values of all the pixels to be predicted by adding 4 to the first output signal out1 and making three logic right shifts.

When the pixels h0~h3 do not exist and the pixels v0~v3 exist, the computation control unit 10 outputs the pixels v0~v3 sequentially and respectively during the first to fourth cycles in a similar fashion, and can obtain the values of the pixels to be predicted during the fourth cycle after adding 2 to the value of the first output signal out1 (equal to sum of the pixels v0~v3) and making two logic right shifts. On the other hand, when the pixels v0~v3 do not exist and the pixels h0~h3 exist, the computation control unit 10 outputs the pixels h0~h3 sequentially and respectively during the first four cycles, and can obtain the values of the pixels to be predicted by adding 2 to the sum of the pixels h0~h3 and making a logic right shift of 2 bits.

When the computation control unit 10 detects that none of the pixels h~h3 and v0~v3 exist, the computation control unit 10 directly uses 128 as the value of the pixel to be predicted.

Intra Prediction of 8×8 Luminance Macroblock

When the macroblock to be predicted is an 8×8 luminance macroblock and the computation control unit 10 uses intra prediction to calculate the values of the pixels to be predicted, for the 8×8 luminance macroblock, the computation control unit 10 can use mode 0, mode 1, modes 3~8, and DC mode of intra prediction to calculate the values of the pixels to be predicted, and the method of calculation is similar to that for 4×4 luminance macroblocks.

Intra Prediction of 16×16 Luminance Macroblock

When the macroblock to be predicted is a 16×16 luminance macroblock and the computation control unit 10 uses intra prediction to calculate the values of the pixels to be predicted, for the 16×16 luminance macroblock, the computation control unit 10 can use the vertical mode, the horizontal mode, the DC mode, or the plane mode to obtain the same.

Intra Prediction of 16×16 Luminance Macroblock (Vertical, Horizontal, DC Modes)

The processing in the vertical mode, horizontal mode, and DC mode correspond respectively to mode 0, mode 1, and DC mode of intra prediction used to calculate 4×4 luminance macroblocks. Besides, when the DC mode is used for calculation, the computation control unit 10 also sets the first to sixth processing units 11~16 to have the same manner of connection as shown in FIG. 9. Thus, these modes will not be described in further detail herein for the sake of brevity.

Intra Prediction of 16×16 Luminance Macroblock (Plane Mode)

Figure 10:
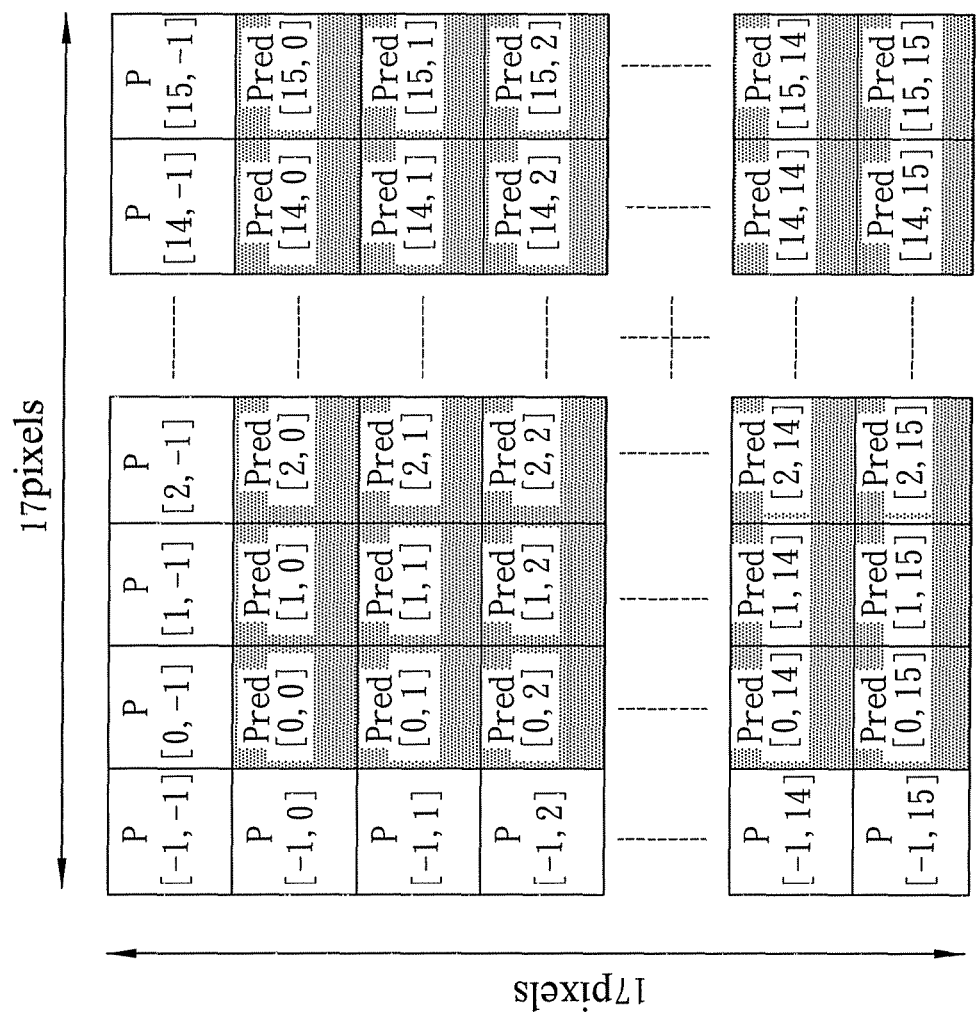
FIG. 10 is a schematic diagram to illustrate the relationship between coordinates of the pixel to be predicted and the pixel of the reference block under a plane mode of intra prediction.

Referring to FIG. 10, when the plane mode of intra prediction is used to calculate the pixel values of a 16×16 luminance macroblock, the relations between the pixel value pred[x,y] to be predicted and the pixels p[−1,−1]~p[−1,15] and p[0,−1]~p[15,−1] of the reference block are expressed in the following equations, where x=0~15 and y=0~15:

$$pred[x,y]=\text{clipY}[(a+b\times(x-7)+c\times(y-7)+16)>>5]=\text{clipY}[(M+bx+cy)>>5] \quad \text{equation (10-1)}$$

$$M=a-7b-7c+16 \quad \text{equation (10-2)}$$

$$a=16\times(p[-1,15]+p[15,-1]) \quad \text{equation (10-3)}$$

$$b=(5\times H+32)>>6 \quad \text{equation (10-4)}$$

$$c=(5\times V+32)>>6 \quad \text{equation (10-5)}$$

$$H=\sum_{m=0}^{7}(m+1)\times(p[8+m,-1]-p[6-m,-1]) \quad \text{equation (10-6)}$$

$$V=\sum_{n=0}^{7}(n+1)\times p[-1,8+n]-p[-1,6-n]) \quad \text{equation (10-7)}$$

where "clipY" is to limit the value of [(a+b×(x−7)+c×(y−7)+16)>>5] between an upper limit and a lower limit, and the upper limit and the lower limit are related to the resolution of these pixels and are defined in the H.264 standard.

Figure 11:
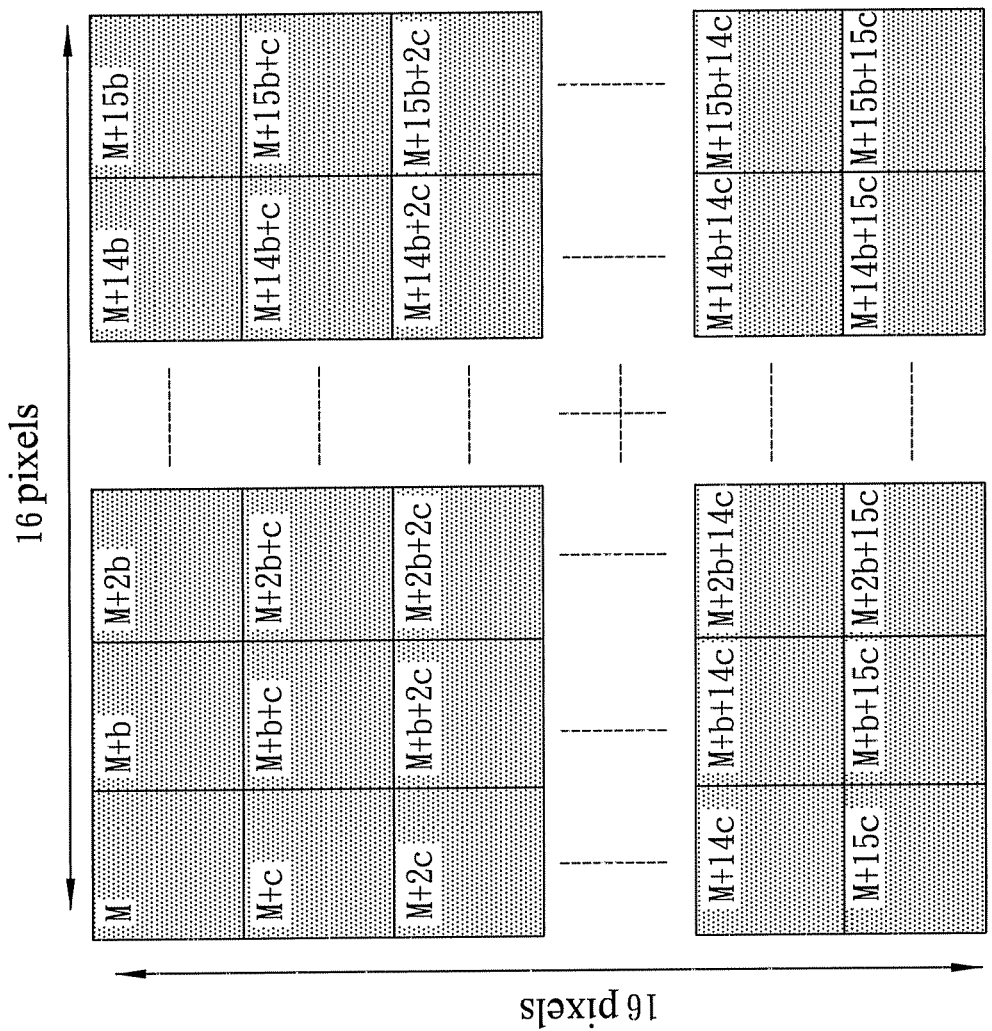
FIG. 11 is a schematic diagram to illustrate the relationship between the pixel value to be predicted and the pixel value of the reference block under the plane mode of intra prediction.

From equations (10-1) and (10-2), it can be known that if the "clipY" operation is ignored first, the value of the pixel pred[0,0] at the upper leftmost corner of the 16×16 luminance macroblock to be predicted is equal to M>>5, the values of two adjacent pixels to be predicted in the horizontal rightwise direction are incremented by b, and the values of two adjacent pixels to be predicted in the vertical downward direction are incremented by c. Therefore, the pixel values of the macroblock to be predicted will be such as that shown in FIG. 11. Thus, after calculating the pixel pred[0,0] at the upper leftmost corner to be equal to M, it is only necessary to increment the other pixels to be predicted by b or c to obtain the values thereof.

H in equation (10-6) can be expressed as follows:

$$H = \sum_{m=0}^{7}(m+1)\times(p[8+m,-1]-p[6-m,-1]) \quad \text{equation (10-8)}$$
$$= \{(p[8,-1]-p[6,-1])+2\times(p[9,-1]-p[5,-1])+3\times(p[10,-1]-p[4,-1])+4\times(p[11,-1]-p[3,-1])+5\times(p[12,-1]-p[2,-1])+6\times(p[13,-1]-p[1,-1])+7\times(p[14,-1]-p[0,-1])+8\times(p[15,-1]-p[-1,-1])\}$$

$$= -(p[-1,-1]\ll 3)- \quad \text{equation (10-9)}$$
$$\{(p[0,-1]\ll 3)-p[0,-1]+$$
$$(p[1,-1]\ll 2)+(p[1,-1]\ll 1)+$$
$$(p[2,-1]\ll 2)+p[2,-1]+$$
$$(p[3,-1]\ll 2)\}-\{(p[4,-1]\ll 1)+$$
$$p[4,-1]+(p[5,-1]\ll 1)+$$
$$(p[6,-1])\}+\{p[8,-1]+(p[9,-1]\ll 1)+$$
$$(p[10,-1]\ll 1)+p[10,-1]+(p[11,-1]\ll 2)+(p[12,-1]\ll 2)+p[12,-1]+$$
$$(p[13,-1]\ll 2)+(p[13,-1]\ll 1)+$$
$$(p[14,-1]\ll 3)-p[14,-1]+$$
$$(p[15,-1]\ll 3)\}$$

The pixels p[−1,−1]~p[15,−1] of the reference block in equation (10-8) will be multiplied respectively by 1.8. For example, pixel p[13,−1] will be multiplied by 6. However, in order to ensure that the multipliers 112, 122, 132, 142, 152 of the first to fifth processing units 11~15 can complete the multiplication operation within a cycle's time, the operation of multiplying p[13,−1] by 6 is decomposed into two logic left shift operations in equation (10-9). The two logic left shift operations are to use the pixel p[13,−1] as the operand and to shift left 1 bit and 2 bits, respectively, which is equivalent to multiplying the pixel p[13,1] by 2 and 4, respectively. The sum of the two logic left shift operations is equal to the product of multiplying the pixel p[13,−1] by 6.

The operations of multiplying the other pixels of the reference block respectively by 3~8 in equation (10-8) are also expressed in sums of a plurality of logic left shift operations in equation (10-9). Equation (10-9) includes 24 logic left shift operations using the pixels p[−1,−1]~p[15,−1] of the reference block as operands. The parameter V in equation (10-7) may also be expressed in the same way as 24 logic left shift operations using the pixels p[−1,−1]~p[−1,15] of the reference block as operands.

Figure 12:
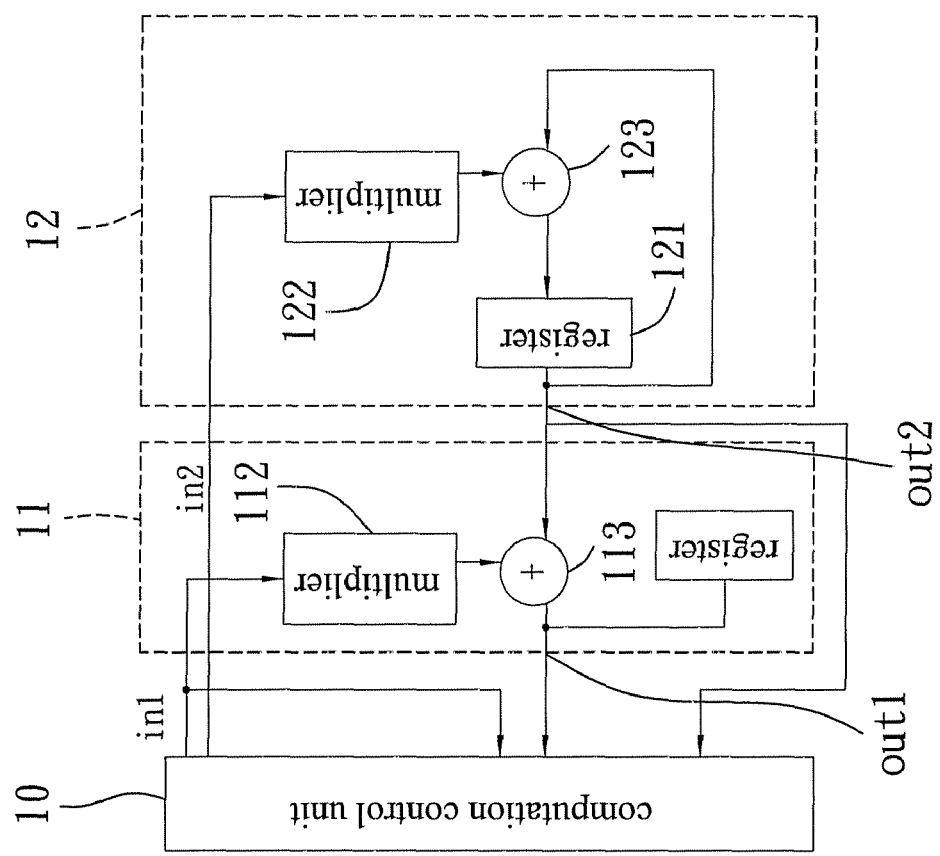
FIG. 12 is a simplified circuit diagram to illustrate a connective relationship that may be present among the components of the computation control unit, the first processing unit and the second processing unit under the plane mode of intra prediction.

Referring to FIGS. 4 and 12, in order to calculate parameter H from equation (10-9), the computation control unit 10 sets the second multiplexer 125 of the second processing unit 12 to send the data at the second input end thereof to the output end thereof, and further sets the first multiplexer 124 of the second processing unit 12 to send the data at the second input end thereof to the output end thereof, sets the multiplexer 114 of the first processing unit 11 to send the data at the second input end thereof to the output end thereof. Thus, the computation control unit 10 and the first to sixth processing units 11~16 can be simplified in the manner as shown in FIG. 12.

The computation control unit 10 arranges the pixels p[−1,−1]~p[15,−1] of the reference block in the order of the operands of the equation (10-9), and outputs the same in sequence to the multiplier 112 of the first processing unit 11 as the first pixel signal in1 during the first to twenty-fourth cycles. The computation control unit 10 sets the multiplier 112 of the first processing unit 11 to correspond to the logic left shift operation of each operand in each cycle. After twenty-four cycles, the first output signal out1 will be equal to the parameter H. The computation control unit 10 can also use the pixels p[−1,−1]~p[−1,15] of the reference block as the second pixel signal in2, and the output end of the adder 123 of the second processing unit 12 can obtain the parameter V in the same way after 24 cycles.

The computation control unit 10 receives the first and second output signals out1, out2, multiplies the first and second output signals out1, out2 by 5, adds 32 to each, and makes a logic right shift operation of 6 bits to obtain b and c in equation (10-4) and equation (10-5). Then, the computation control unit 10 uses b and c as the first and second pixel signals in1, in2, sends the same to the multipliers 112, 122 of the first and second processing units 11, 12 for multiplying b and c by −7, respectively, and receives the values of the first and second output signals out1, out2 (respectively equal to −7b and −7c). Subsequently, the computation control unit 10 uses three cycles to send the pixels p[−1,15] and p[15,−1] to the first processing unit 11 in a similar manner so as to calculate the value of parameter a in equation (10-2). After obtaining the values of parameters a, −7b, and −7c, the computation control unit 10 further uses 3 cycles to send the parameters a, −7b, and −7c to the first processing unit 11 so as to calculate the value of parameter M in equation (10-2). Lastly, the values of b and c are sent to the first processing unit 11 in 256 (16×16) cycles so as to increment the value of the parameter M by b and c to thereby obtain a 16×16 luminance macroblock corresponding to FIG. 10.

Intra Prediction of 16×16 Chrominance Macroblock

When intra prediction is used, the equations for calculating the pixels of the 16×16 chrominance macroblock to be predicted are the same as those for calculating the pixels of the 16×16 luminance macroblock. Therefore, the computation control unit 10 sets the elements of the first to sixth processing units 11~16 to have the same manner of connection as those for calculating the 16×16 luminance macroblock. Chrominance macroblocks of other sizes that are to be predicted are similar to the 16×16 chrominance macroblock, and they differ only in the size of the macroblock. Thus, the connective relationship between the computation control unit 10 and the first to sixth processing units 11~16 will not be described in detail herein for the sake of brevity.

Inter Prediction of Luminance Macroblock

Referring to FIG. 4, when the computation control unit 10 uses inter prediction to calculate the macroblock to be predicted, the computation control unit 10 receives a reference block located in other static images as outputted by the frame buffer 96. The static image in which the reference block is located corresponds to the reference index, and the position of the static image in the reference block is related to the motion vector.

The pixel which the motion vector points to is the pixel value at the upper leftmost corner of the macroblock to be predicted, and may be a full-pel pixel or a sub-pel pixel. The x- and y-coordinate values of the full-pel pixel are integer values, and the value of one of the x- and y-coordinates of the sub-pel pixel is a non-integer value. The sub-pel pixel includes a half-pel pixel and a quarter-pel pixel. The x-coordinate or y-coordinate of the half-pel pixel is in the middle of two full-pels. Pixels whose x-coordinate or y-coordinate falls into other situations are quarter-pel pixels.

The size of the reference block is correlated to the size and type of the macroblock to be predicted, and whether the pixel which the motion vector points to is a full-pel pixel or a sub-pel pixel. The correlation is defined under the H.264 standard. The following description is first directed to the scenario in which the macroblock to be predicted is a 4×4 luminance macroblock.

Inter Prediction of Luminance Macroblock (where the x- and y-Coordinates are Integers)

When the pixel which the motion vector points to is a full-pel, the computation control unit 10 directly uses the pixel which the motion vector points to as the value of the upper leftmost corner of the 4×4 macroblock to be predicted, with the pixel values that are 1 to 3 pixels downward and rightward from the pixel which the motion vector points to corresponding directly to the other pixel values of the macroblock to be predicted according to the positions thereof.

Inter Prediction of Luminance Macroblock (where the x-Coordinate is a Sub-pel, and the y-Coordinate is a Full-pel)

Figure 13:
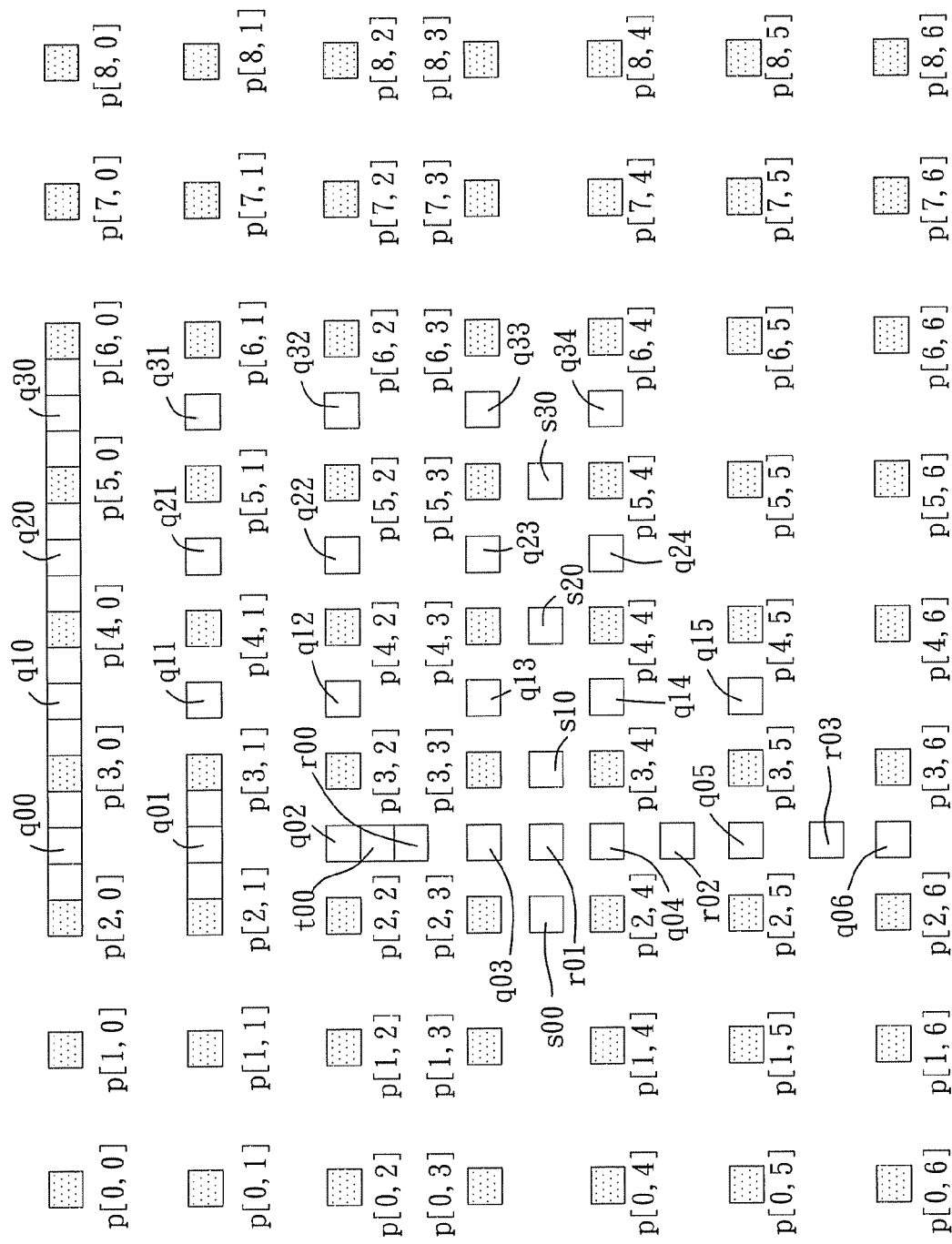
FIG. 13 is a schematic diagram to illustrate the relationship between coordinates of a pixel which a motion vector points to and a pixel of the reference block when inter prediction is used to calculate a luminance macroblock.

When the x-coordinate of the pixel to which the motion vector points to is in the middle of two full-pels, and the y-coordinate thereof is an integer, such as the pixel q00 in FIG. 13, since a pixel is actually not present at the position which the motion vector points to, the computation control unit 10 performs interpolation using the following equation (11-2) according to the three full-pel pixels to the left of the pixel q00 and the three full-pel pixels to the right of the pixel q00 so as to calculate the value of the pixel q00:

$$q00 = \text{clipY}\{(q00\_1+16) >> 5\} \qquad \text{equation (11-1)}$$

$$q00\_1 = (p[0,0] - 5 \times p[1,0] + 20 \times p[2,0] + 20 \times p[3,0] - 5 \times p[4,0] + p[5,0]) \qquad \text{equation (11-2)}$$

The computation control unit 10 calculates the values of the pixels q10, q20, and q30 that are 1 to 3 pixels rightwise from the pixel q00 to serve as the values of the first row of pixels of the luminance macroblock to be predicted, and further calculates the values of the pixels q01, q11, q21 and q31 that are respectively 1 pixel downward from the pixels q00, q10, q20, and q30 to serve as the values of the second row of pixels of the luminance macroblock to be predicted. Similarly, the third and fourth rows of pixels of the macroblock to be predicted are pixels q02, q12, q22, q32, q03, q13, q23, and q33 which are respectively two and three pixels downward from the pixels q00, q10, q20, and q30. The pixels q00, q10, q20, q30, q01, q11, q21, q31, q02, q12, q22, q32, q03, q13, q23, and q33 have to be calculated according to the values of the pixels p[0,0]~p[8,0], p[0,1]~p[8,1], p[0,2]~p[8,2], and p[0,3]~p[8,3] using equations like equations (11-1) and (11-2). Thus, the reference block is 9×4.

Figure 14:
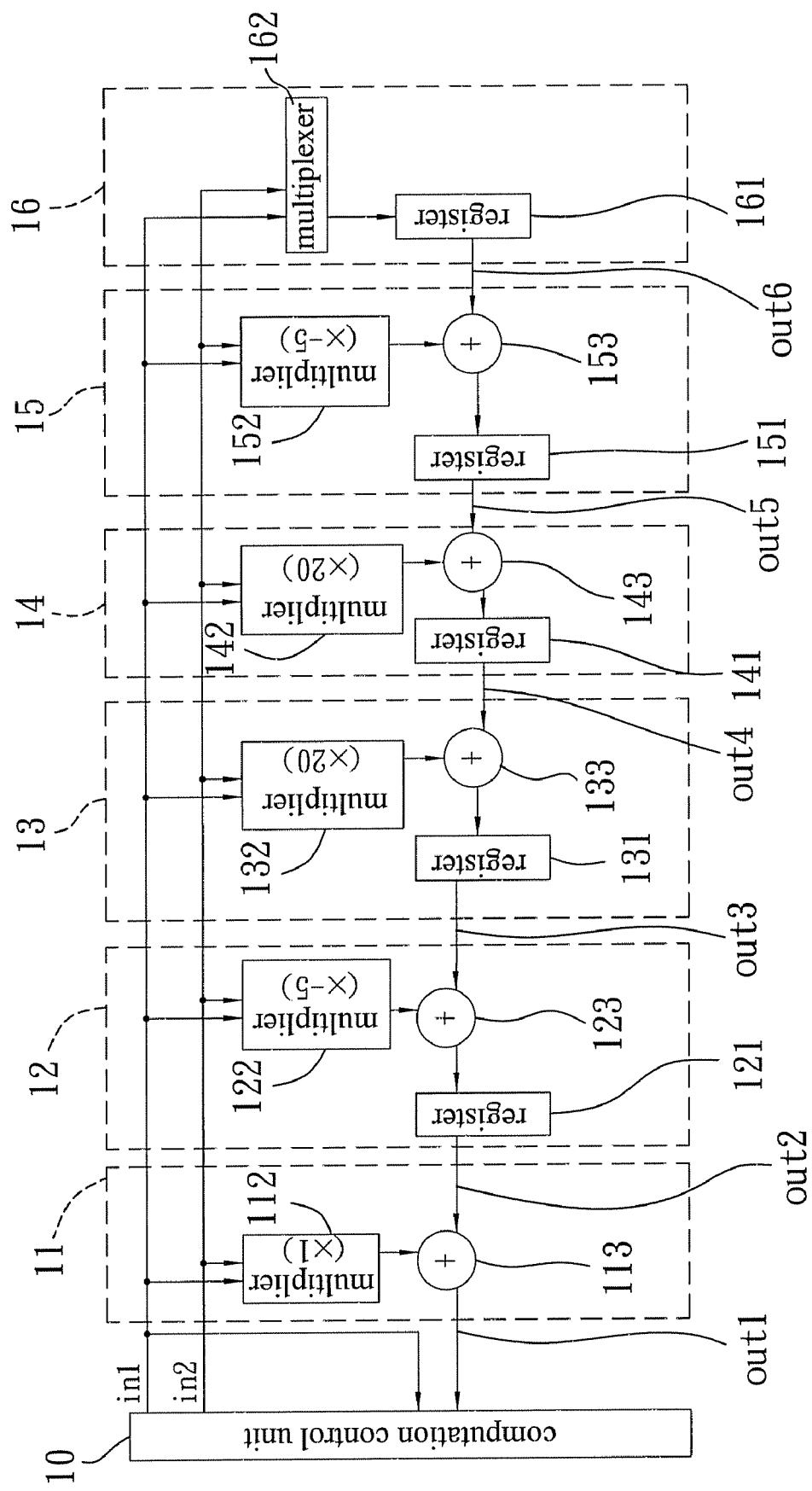
FIG. 14 is a simplified circuit diagram to illustrate a connective relationship that may be present among the components of the computation control unit, the first processing unit, the second processing unit, the third processing unit, a fourth processing unit, a fifth processing unit, and a sixth processing unit when inter prediction is used to calculate the luminance macroblock.

Referring to FIG. 4 and FIG. 14, in order to calculate the luminance macroblock to be predicted, the computation control unit 10 sets the multiplexer 154 of the fifth processing unit 15 to send the data at the second input end thereof to the output end thereof, and further sets the multiplexer 134 of the third processing unit 13 to send the data at the second input end thereof to the output end thereof. The first multiplexer 124 of the second processing unit 12 sends the data at the second input end thereof to the output end thereof. The second multiplexer 125 of the second processing unit 12 sends the data at the first input end thereof to the output end thereof. The multiplexer 114 of the first processing unit 11 is set to send the data at the first input end thereof to the output end thereof. The multipliers 112, 122, 132, 142, 152 of the first to fifth processing units 11~15 are set to multiply the value of the first pixel signal in1 or the second pixel signal in2 by 1, −5, 20, 20, −5, and 1, respectively. Thus, the circuit diagram of FIG. 4 can be simplified in a manner as shown in FIG. 14.

Figure 15:
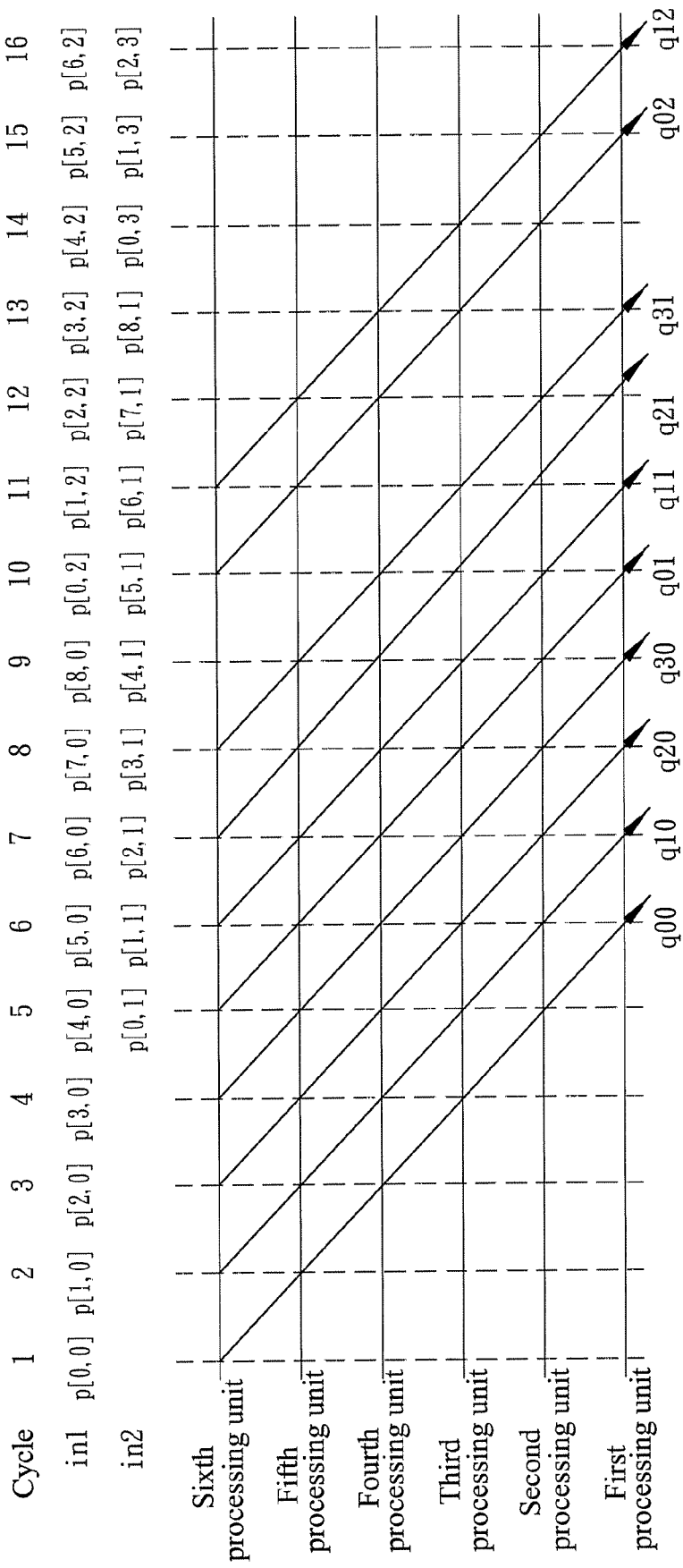
FIG. 15 is a signal diagram to illustrate values of pixel signals that the first to sixth processing units receive from the computation control unit during each cycle.

Referring to FIG. 15, the computation control unit 10 uses the first row of pixels p[0,0]~p[8,0] and the third row of pixels p[0,2]~p[8,2] of the reference block as the value of the first pixel signal in1 during the first to eighteenth cycles in sequence, and outputs the second row of pixels p[0,1]~p[8,1] and the fourth row of pixels p[0,3]~p[8,3] in sequence during the fifth to twenty-second cycles as the value of the second pixel signal in2. It is noted that, for the sake of clarity, only the values p[0,0]~p[0,8], p[0,2]~p[6,2], p[0,1]~p[8,1], and p[3,0]~p[2,3] to which the pixel signals in1, in2 correspond during the first to sixteenth cycles are depicted in FIG. 15.

In FIG. 15, the intersecting point between each horizontal line and each vertical imaginary line represents the pixel value received by the processing unit to which the respective horizontal line corresponds in each cycle. During the first to fourth cycles, the computation control unit 10 sets the multipliers 112, 122, 132, 142, 152 of the first to fifth processing units 11~15 to receive the first pixel signal in1, and to multiply the same by 1, −5, 20, 20, −5, and 1, respectively. The multiplexer 162 of the sixth processing unit 16 sends the first pixel signal in1 to the output end thereof.

Referring to both FIGS. 14 and 15, during the fifth cycle, since the pixel q30 equals clipY$\{(p[3,0]-5\times p[4,0]+20\times p[5,0]+20\times p[6,0]-5\times p[7,0]+p[8,0]+16)>>5\}$, the computation control unit 10 will calculate the pixels q01, q11, q21, and q31 in the successive cycles, the value p[4,0] of the pixel will not be used again, and it is only necessary to calculate −5×p[4,0]. Therefore, the computation control unit 10 does not need to output the pixel p[4,0] to the register 161 of the sixth processing unit 16.

Accordingly, during the fifth cycle, the computation control unit 10 sets the multiplexer 162 of the sixth processing unit 16 to receive the value p[0,1] of the second pixel signal in2, and further sets the multipliers 112, 122, 132, 142, 152 of the first to fifth processing units 11~15 to receive the value p[4,0] of the first pixel signal in1 so as to enable the multiplier 152 of the fifth processing unit 15 to calculate the value of −5×p[4,0].

During the sixth cycle, the computation control unit 10 uses the pixels p[5,0] and p[1,1] as the first pixel signal in1 and the second pixel signal in2, respectively, sets the multiplexer 162 of the sixth processing unit 16 and the multiplier 152 of the fifth processing unit 15 to receive the second pixel signal in2, and further sets the multipliers 112, 122, 132, 142 of the first to fourth processing units 11~14 to receive the first pixel signal in1. After the sixth cycle, the computation control unit 10 receives the data outputted by the adder 113 of the first processing unit 11, adds 16 thereto, and makes a logic right shift of 5 bits, thereby obtaining the pixels q00, q10, q20, q30, q01, q11, q21, q31, q02, q12, q22, q32, q03, q13, q23, and q33, in sequence.

Inter Prediction of Luminance Macroblock (where the x and y-Coordinates are Non-integers)

When both the x-coordinate and the y-coordinate of the half-pel pixel which the motion vector points to are in the middle of two full-pels, such as pixel r00 in FIG. 13, the value of the pixel r00 can be calculated using the following equations:

$$r00 = \text{clipY}\{(r00\_1+512)>>10\} \qquad \text{equation (11-3)}$$

$$r00\_1 = (q00 - 5 \times q01 + 20 \times q02 + 20 \times q03 - 5 \times q04 + q05) \qquad \text{equation (11-4)}$$

The pixels q00, q01, q02, q03, q04, and q05 are sub-pels, and can be calculated by referring to pixels p[0,0]~p[5,0], p[0,1]~p[5,1], p[0,2]~p[5,2], p[0,3]~p[5,3], p[0,4]~p[5,4] and p[0,5]~p[5,5] and by performing interpolation using equations similar to equations (11-1) and (11-2).

The computation control unit 10 further needs to calculate the pixels that are 1 to 3 pixels from the pixels r00, r01, r02, and r03 in an x direction to serve as the first to third rows of pixel values of the 4×4 macroblock to be predicted.

Therefore, the computation control unit 10 uses a 9×9 reference block to calculate the 4×4 macroblock to be predicted. The reference block includes the pixels p[x,y] where x=0~8 and y=0~8. The computation control unit 10 first uses the pixels in the odd-number row and the pixels in the even-number row of the 9×9 reference block as the first and second pixel signals in1, in2, respectively, and arranges the same in a manner similar to that shown in FIG. 15 for sequential output so as to calculate a 4×9 macroblock having the pixel q00 as the upper leftmost pixel.

Subsequently, the computation control unit 10 uses the pixels in the odd-number rows and the pixels in the even-number rows of the 4×9 macroblock as the first and second pixel signals in1, in2, and likewise arranges the same in a manner similar to that shown in FIG. 15 for sequential output so as to calculate a 4×4 macroblock having the pixel r00 as the upper leftmost pixel.

Figure 16:
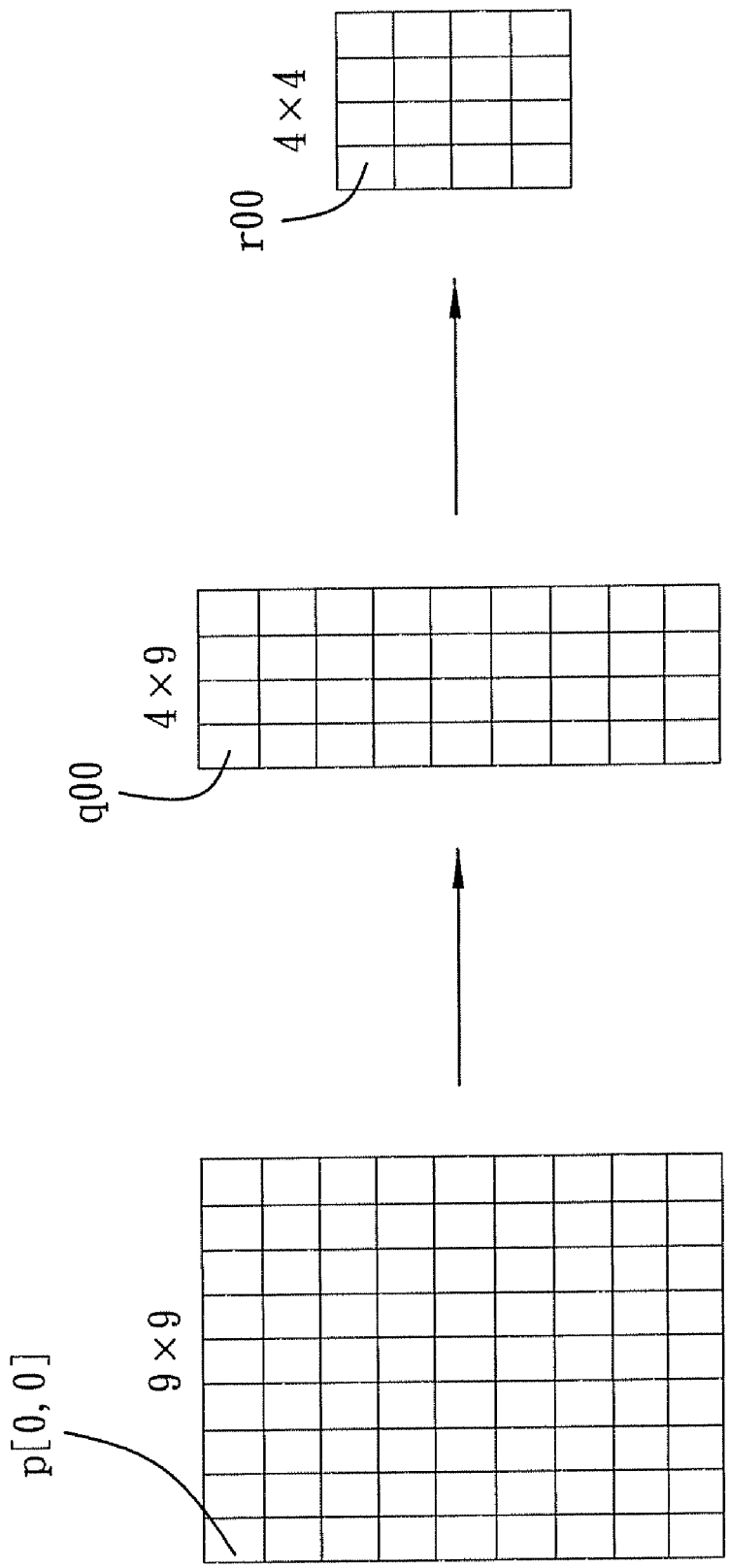
FIG. 16 is a schematic diagram to illustrate how the computation control unit calculates a 4×9 reference block from a 9×9 reference block, and how the same calculates a 4×4 luminance macroblock from the 4×9 reference block when inter prediction is used to calculate the luminance macroblock.

Thus, referring to FIG. 16, the computation control unit 10 calculates a 4×9 reference block from the 9×9 reference block, and uses the pixels in the odd-number rows and the pixels in the even-number rows of the 4×9 reference block as the first and second pixel signals in1, in2 to be sent sequentially to the first to sixth processing units 11~16 so as to obtain the 4×4 luminance macroblock to be predicted. Therefore, for a luminance macroblock with a motion vector pointing to a pixel whose x- and y-coordinates are between two full-pels, two interpolative calculations have to be executed.

Inter Prediction of Luminance Macroblock (where the x-coordinate is an Integer, and the y-coordinate is a Non-integer)

When the motion vector points to a half-pel pixel whose x-coordinate is an integer and whose y-coordinate is between two full-pels, such as pixel s00 in FIG. 13, the value of the pixel s00 is calculated using the following equations:

$$s00 = clipY\{(s00\_1+16)>>5\} \qquad \text{equation (11-5)}$$

$$s00\_1 = (p[2,1]-5 \times p[2,2]+20 \times p[2,3]+20 \times p[2,4]-5 \times p[2,5]+p[2,6]) \qquad \text{equation (11-6)}$$

Since the calculation to obtain the pixel pointed to by the motion vector involves use of three adjacent full-pel pixels thereabove and three adjacent full-pel pixels therebelow, and equations (11-5) and (11-6), the reference block includes 4×9 pixels. The computation control unit 10 sends the pixels in each row of the reference block to the first to sixth processing units 11~16, and executes one interpolation using equations (11-5) and (11-6) to thereby obtain the macroblock to be predicted.

Interprediction of Luminance Macroblock (Quarter-Pel)

When the motion vector points to a quarter-pel pixel, such as pixel t00 in FIG. 13, the value of the pixel t00 can be calculated using the following equation:

$$t00 = (q02+r00+1)>>1$$

Therefore, the computation control unit 10 needs to calculate the value of the pixel t00 according to the values of the pixels q02 and r00, and the method for calculating pixels q02 and r00 is as described hereinabove.

When the computation control unit 10 uses inter prediction to calculate luminance macroblocks of other sizes, the calculation is similar to that described hereinabove, with the difference residing in the sizes of the macroblocks.

Inter Prediction of Chrominance Macroblock

When the computation control unit 10 uses inter prediction to calculate a chrominance macroblock, since the pixels of the chrominance macroblock in the x and y directions are only half of those of the luminance macroblock, the following description is directed to the calculation of a 2×2 chrominance macroblock corresponding to a 4×4 luminance macroblock. The pixel value which the motion vector points to is likewise equivalent to the pixel at the upper leftmost corner of the macroblock to be predicted.

Figure 17:
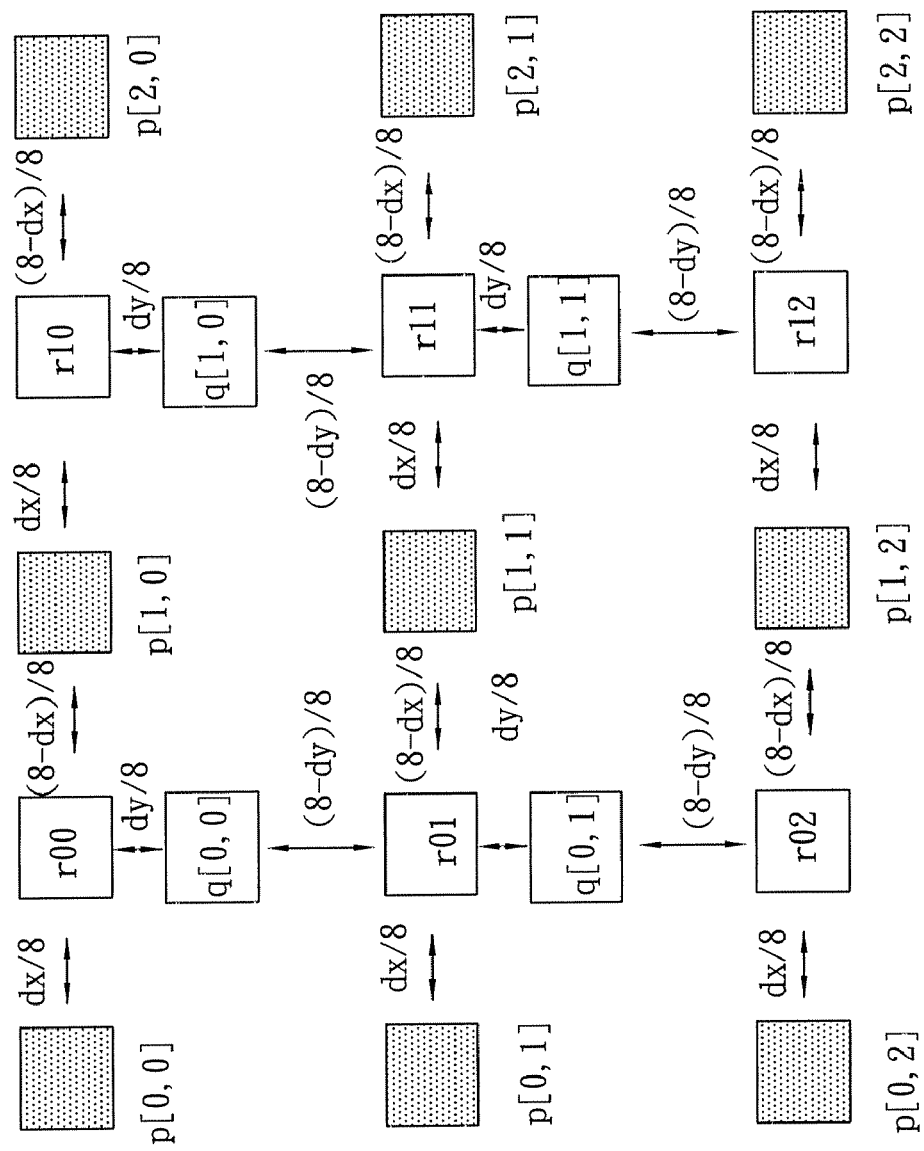
FIG. 17 is a schematic diagram to illustrate the relationship between coordinates of a pixel which a motion vector points to and a pixel of the reference block when inter prediction is used to calculate a chrominance macroblock.

When the pixel which the motion vector points to is a sub-pel, such as pixel q[0,0] in FIG. 17, the size of the reference block must be 3×3. The pixels p[x,y] are full-pel pixels adjacent to the pixel q[0,0], where x=0~1 and y=0~1. The distance from the pixel q[0,0] to pixel p[0,0] is dy/8 in the y direction and is dx/8 in the x direction. The distance from the pixel q[0,0] to the pixel p[1,1] is (8−dy)/8 in the y direction and is (8−dx)/8 in the x direction. The distances from the pixels q[0,1], q[1,0] and q[1,1] to the respective adjacent full-pel pixel correspond to the distances from the pixel q[0,0] to the pixels p[0,0], p[0,1], p[1,0], and p[1,1] For the chrominance macroblock, each of dx and dy is an integer from 0 to 7.

The pixel q[0,0] must be calculated according to the pixels r00 ˋr01 using the following equations (12-1) to (12-3):

$$q[0,0]\{[dy \times r01+(8-dy) \times r00]>>3\} \qquad \text{equation (12-1)}$$

$$r00 = dx \times p[1,0]+(8-dx) \times p[0,0] \qquad \text{equation (12-2)}$$

$$r01 = dx \times p[1,1]+(8-dx) \times p[0,1] \qquad \text{equation (12-3)}$$

The pixel q[1,0] must be calculated according to the pixels r10, r11 using the following equations (12-4) to (12-6):

$$q[1,0] = \{[dy \times r11+(8-dy) \times r10]>>3\} \qquad \text{equation (12-4)}$$

$$r10 = dx \times p[2,0]+(8-dx) \times p[1.0] \qquad \text{equation (12-5)}$$

$$r11 = dx \times p[2,1]+(8-dx) \times p[1,1] \qquad \text{equation (12-6)}$$

When both dx and dy are 0, the pixel which the motion vector points to is a full-pel. The 2×2 reference block having the pixel which the motion vector points to as the upper leftmost pixel is the chrominance macroblock to be predicted.

Figure 18:
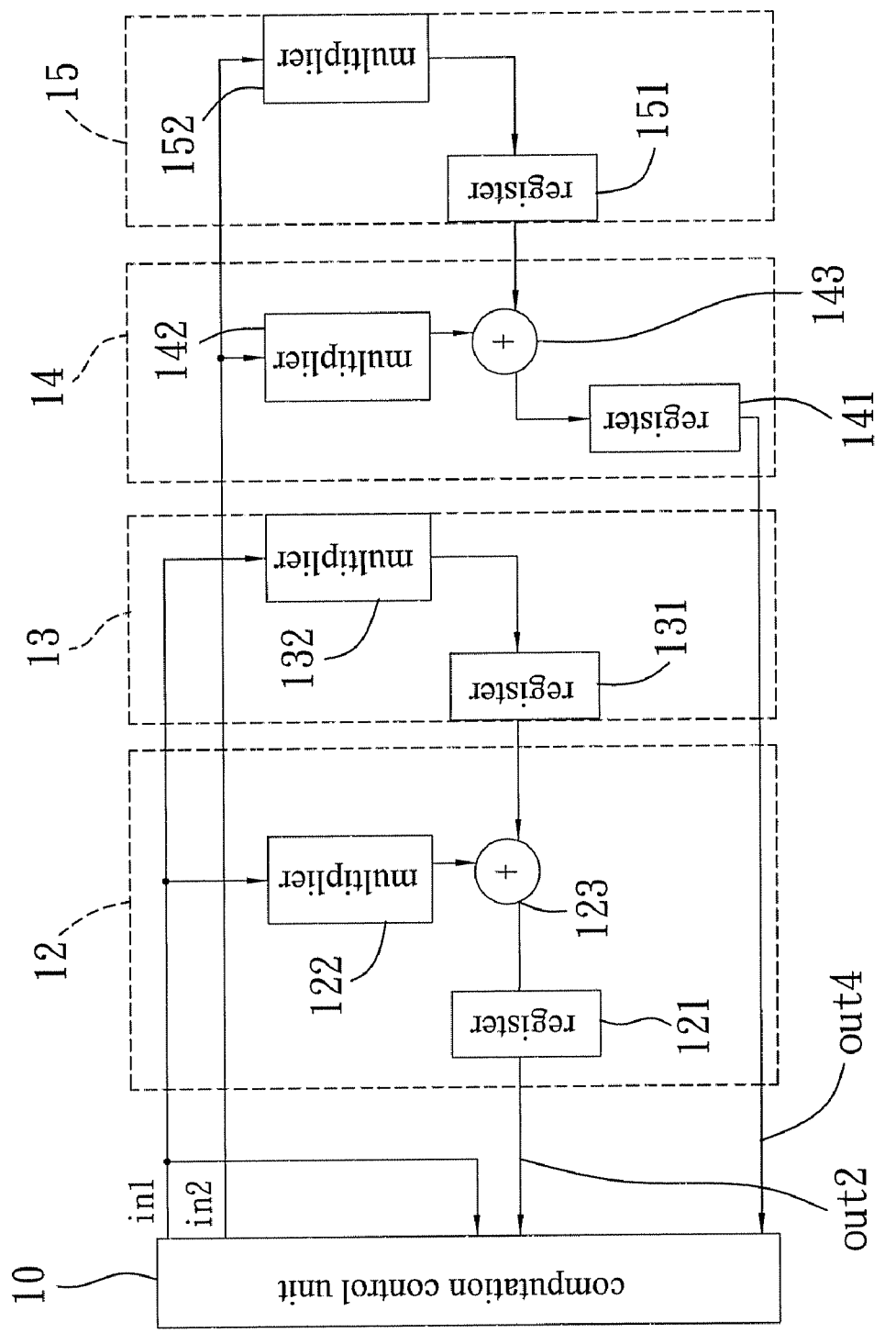
FIG. 18 is a simplified circuit diagram to illustrate a connective relationship that may be present among the components of the computation control unit, the second processing unit, the third processing unit, the fourth processing unit, and the fifth processing unit when inter prediction is used to calculate the chrominance macroblock.

Referring to FIGS. 4 and 18, when inter prediction is used to calculate a chrominance macroblock, the computation control unit 10 sets the multipliers 122, 132 of the second processing unit 12 and the third processing unit 13 to receive the first pixel signal in1, further sets the multipliers 142, 152 of the fourth processing unit 14 and the fifth processing unit 15 to receive the second pixel signal in2, additionally sets the multiplexer 154 of the fifth processing unit 15 to send the data at the first input end thereof to the output end thereof, and also sets the multiplexer 134 of the third processing unit 13 to send the data at the first input end thereof to the output end thereof. The computation control unit 10 further sets the second multiplexer 125 of the second processing unit 12 to send the data at the first input end thereof to the output end thereof. The first multiplexer 124 of the second processing unit 12 sends the data at the second input end thereof to the output end thereof. Therefore, the connective relation between the computation control unit 10 and the first to sixth processing units 11~16 can be simplified in the manner as shown in FIG. 18.

In the preferred embodiment of this invention, the computation control unit 10 uses the pixels of the Cr reference block and the Cb reference block as the first pixel signal in1 and the second pixel signal in2, respectively. The second and third processing units 12, 13 receive the first pixel signal in1 to calculate the Cr macroblock to be predicted. The third and fourth processing units 13, 14 receive the second pixel signal in2 to calculate the Cb macroblock to be predicted.

Referring to FIGS. 17 and 18, the computation control unit 10 sets the multipliers 122, 132 of the second and third processing units 12, 13 to multiply the first pixel signal in1 by dx and (8−dx), respectively, to use the pixels p[0,0]~p[2,0], p[0,1]~p[2,1] and p[0,2]~p[2,2] of the reference block as the first pixel signal in1 for sequential output in each cycle, and to receive the output of the register 121 of the second processing unit 12. Table 7 shows the values of the second and third output signals out2, out3 from the first to ninth cycles, in which since the output data of the second processing unit 12 in the fifth cycle and the eighth cycle are not obtained by calculating pixels in the same row of the reference block using an equation similar to equation (12-2), they do not correspond to one of the pixels r00, r10, r01, r11, r02, and r12.

TABLE 7

| Cycle | in1 | out3 | out2 |
|---|---|---|---|
| 1 | P[0, 0] | — | — |
| 2 | P[1, 0] | $(8 - dx) \times p[0, 0]$ | — |
| 3 | P[2, 0] | $(8 - dx) \times p[1, 0]$ | $(8 - dx) \times p[0, 0] + dx \times p[1, 0]$ |
| 4 | P[0, 1] | $(8 - dx) \times p[2, 0]$ | $(8 - dx) \times p[1, 0] + dx \times p[2, 0]$ |
| 5 | P[1, 1] | $(8 - dx) \times p[0, 1]$ | $(8 - dx) \times p[2, 0] + dx \times p[0, 1]$ |
| 6 | P[2, 1] | $(8 - dx) \times p[1, 1]$ | $(8 - dx) \times p[0, 1] + dx \times p[1, 1]$ |
| 7 | P[0, 2] | $(8 - dx) \times p[2, 1]$ | $(8 - dx) \times p[1, 1] + dx \times p[2, 1]$ |
| 8 | P[1, 2] | $(8 - dx) \times p[0, 2]$ | $(8 - dx) \times p[2, 1] + dx \times p[0, 2]$ |
| 9 | P[2, 2] | $(8 - dx) \times p[1, 2]$ | $(8 - dx) \times p[0, 2] + dx \times p[1, 2]$ |

Figure 19:
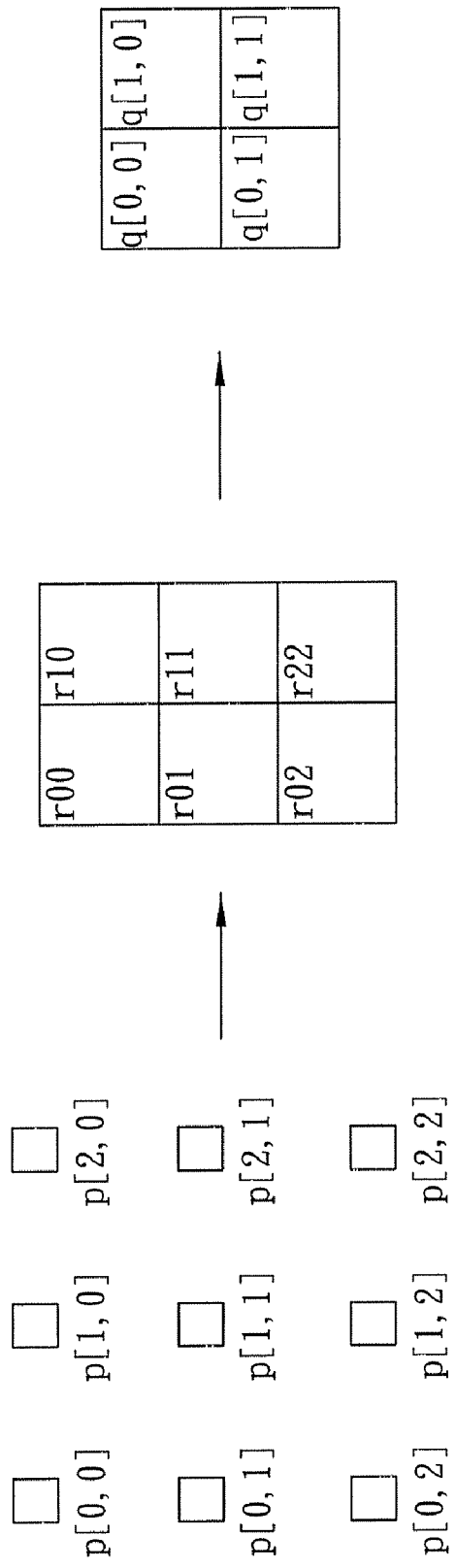
FIG. 19 is a schematic diagram to illustrate how the computation control unit calculates a 2×3 reference block from the 3×3 reference block, and how the same calculates a 2×2 chrominance macroblock from the 2×3 reference block when inter prediction is used to calculate the chrominance macroblock.

Referring to FIG. 19, the computation control unit 10 receives the pixels r00, r10, r01, r11, r02, and r12, and uses the pixels r00, r10, r01, r11, r02, and r12 as the first pixel signal in1 for sequential output to the second and third processing units 12, 13 to thereby obtain the 4×4 Cb macroblock to be predicted.

The computation control unit 10 uses the pixels of the Cr reference block as the second pixel signal in2, and outputs the same to the fourth and fifth processing units 14, 15 in a manner similar to the processing of the Cb reference block, thereby obtaining the Cr macroblock to be predicted.

It is noted that, in FIG. 18, the data outputted by the adders 123, 143 of the second and fourth processing units 12, 14 may also be directly sent to the computation control unit 10 so as to shorten the cycle of receiving the data of the second and fourth processing units 12, 14.

Figure 3:
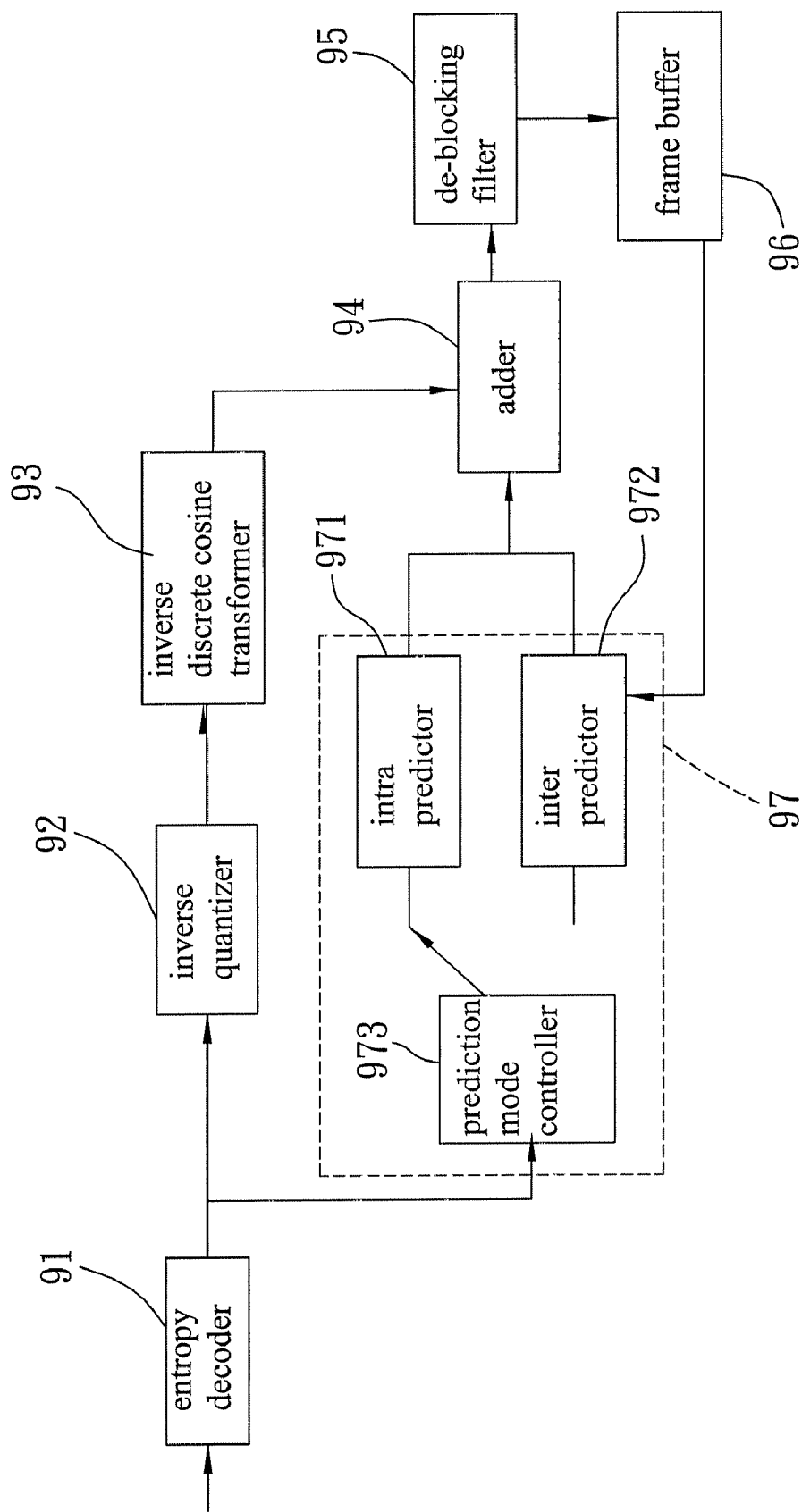
FIG. 3 is a circuit block diagram to illustrate a conventional decoding device including a prediction module having two predictors.

In sum, compared with the conventional prediction module 97 (see FIG. 3) which must include an intra predictor 971 for executing intra prediction and an inter predictor 972 for executing inter prediction, the prediction module of the present invention merely needs to change the connective relationship of the first to sixth processing units 11~16 in order to render the combination of the computation control unit 10 and the first to sixth processing units 11~16 capable of executing intra prediction and inter prediction, thereby achieving an increased hardware utilization efficiency. Thus, the object of the present invention can be positively achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A prediction module adapted to calculate pixel values of a macroblock to be predicted according to data decoded by an entropy decoder and pixels of a reference block outputted by a frame buffer, said prediction module comprising:

a first processing unit which outputs a first output signal;

a second processing unit which is connected electrically to said first processing unit and which outputs a second output signal;

a third processing unit which is connected electrically to said second processing unit and which outputs a third output signal;

a fourth processing unit which is connected electrically to said third processing unit and which outputs a fourth output signal;

a fifth processing unit which is connected electrically to said fourth processing unit and which outputs a fifth output signal;

a sixth processing unit which is connected electrically to said fifth processing unit and which outputs a sixth output signal; and a computation control unit which is connected electrically to said first to sixth processing units, the frame register, and the entropy decoder, which receives the pixels of the reference block and the data outputted by the entropy decoder, which arranges the pixels of the reference block appropriately according to the data outputted by the entropy decoder into a first pixel signal and a second pixel signal for sequential output in units of cycles, which receives the first, second and fourth output signals outputted respectively by said first, second and fourth processing units, and which computes the first, second and fourth output signals so as to obtain the pixel values of the macroblock to be predicted;

said sixth processing unit receiving the first and second pixel signals, and being controlled by said computation control unit to use one of the first and second pixel signals as the value of the sixth output signal to be outputted thereby in a next cycle, said fifth processing unit receiving the first and second pixel signals and the sixth output signal, and being controlled by said computation control unit to execute one of the following two operations and to use the operation result as the value of the fifth output signal to be outputted thereby in a next cycle:

the first operation is to multiply one of the first and second pixel signals by an integer value; and the second operation is to multiply one of the first and second pixel signals by an integer value and then add the sixth output signal;

said fourth processing unit receiving the first and second pixel signals and the fifth output signal, and being controlled by said computation control unit to calculate a computation result of multiplying one of the first and second pixel signals by an integer value and then adding the fifth output signal, and to use the computation result as the value of the fourth output signal in a next cycle;

said third processing unit receiving the first and second pixel signals and the fourth output signal, and being controlled by said computation control unit to execute one of the following two operations, and to use the operation result as the value of the third output signal in a next cycle:

the first operation is to multiply one of the first and second pixel signals by an integer value; and the second operation is to multiply one of the first and second pixel signals by an integer value and then add the fourth output signal;

said second processing unit receiving the first and second pixel signals, the second output signal and the third output signal, and being controlled by said computation control unit to execute one of the following three operations, and to use the operation result as the value of the second output signal in a next cycle:
  the first operation is to multiply one of the first and second pixel signals by an integer value and then add the third output signal;
  the second operation is to multiply one of the first and second pixel signals by an integer value and then add the second output signal; and
  the third operation is to output the first pixel signal; and
said first processing unit receiving the value of the first output signal outputted thereby in a previous cycle, the first and second pixel signals, and the second output signal, and being controlled by said computation control unit to execute one of the following two operations and to use the operation result as the value of the first output signal:
  the first operation is to multiply one of the first and second pixel signals by an integer value and then add the value of the first output signal in the previous cycle; and
  the second operation is to multiply one of the first and second pixel signals by an integer value and then add the second output signal.

2. The prediction module according to claim 1, wherein:
said first processing unit includes a register, a multiplier, an adder, and a multiplexer;
said second processing unit including a register, a multiplier, an adder, a first multiplexer, and a second multiplexer;
said third processing unit including a register, a multiplier, an adder, and a multiplexer;
said fourth processing unit including a register, a multiplier, and an adder;
said fifth processing unit including a register, a multiplier, an adder, and a multiplexer;
said sixth processing unit including a register and a multiplexer;
said register of each of said first to sixth processing units having an output end and an input end, data at said output end thereof being equivalent to data at said input end thereof during the previous cycle, signals at said output ends of said registers of said second to sixth processing units being said second to sixth output signals, respectively;
said multiplier of each of said first to fifth processing units having a first input end, a second input end, and an output end, said first input end and said second input end respectively receiving the values of the first and second pixel signals outputted by said computation control unit, said multiplier of each of said first to fifth processing units being controlled by said computation control unit to complete the computation result of multiplying the value at one of the first and second input ends thereof by an integer value within a cycle and to provide the computation result at said output end thereof;
said adder of each of said first to fifth processing units having a first input end, a second input end, and an output end, completing the computation result of adding the value at said second input end thereof to said first input end thereof within one cycle, and providing the sum at said output end thereof;
said multiplexer of each of said first to sixth processing units having a first input end, a second input end and an output end, and being controlled by said computation control unit to send the value at one of said first and second input ends thereof to said output end thereof;
said sixth processing unit having said first and second input ends of said multiplexer thereof respectively receiving the values of the first and second pixel signals outputted by said computation control unit, said output end of said multiplexer thereof being connected electrically to said input end of said register thereof;
said fifth processing unit having said output end of said multiplier thereof connected electrically to said first input end of said adder thereof and to said first input end of said multiplexer thereof, said second input end of said adder thereof being connected electrically to said output end of said register of said sixth processing unit, said output end of said adder thereof being connected electrically to said second input end of said multiplexer thereof, said output end of said multiplexer thereof being connected electrically to said input end of said register thereof;
said fourth processing unit having said output end of said multiplier thereof connected electrically to said first input end of said adder thereof, said second input end of said adder thereof being connected electrically to said output end of said register of said fifth processing unit, said output end of said adder thereof being connected electrically to said input end of said register thereof;
said third processing unit having said output end of said multiplier thereof connected electrically to said first input end of said adder thereof and said first input end of said multiplexer thereof, said second input end of said adder thereof being connected electrically to said output end of said register of said fourth processing unit, said output end of said adder thereof being connected electrically to said second input end of said multiplexer thereof, said output end of said multiplexer thereof being connected electrically to said input end of said register thereof;
said second processing unit having said output end of said multiplier thereof connected electrically to said first input end of said adder thereof, said second input end of said adder thereof being connected electrically to said output end of said second multiplexer thereof, said output end of said adder thereof being connected electrically to said second input end of said first multiplexer thereof, said first input end of said first multiplexer thereof receiving said first pixel signal outputted by said computation control unit, said output end of said first multiplexer thereof being connected electrically to said input end of said register thereof, said second input end and said first input end of said second multiplexer thereof being connected electrically and respectively to said output end of said register thereof and to said output end of said register of said third processing unit;
said first processing unit having said output end of said multiplier thereof connected electrically to said first input end of said adder thereof, said second input end of said adder thereof being connected electrically to said output end of said multiplexer thereof, said second input end and said first input end of said multiplexer thereof being connected electrically and respectively to said output end of said register thereof and to said output end of said register of said second processing unit, said output end of said adder being connected electrically to said input end of said register thereof and to said computation control unit, the signal at said output end of said adder thereof being the first output signal.

3. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is one of a 4×4 luminance macroblock and an 8×8 luminance macroblock, said computation control unit uses the value of the first pixel signal received in each cycle as the pixel value of the macroblock to be predicted.

4. The prediction according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is one of a 4×4 luminance macroblock and an 8×8 luminance macroblock, said computation control unit controls said third processing unit to execute the first operation thereof, and controls said second processing unit to execute the first operation thereof, said computation control unit further controlling said first processing unit to execute the second operation thereof.

5. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is one of a 4×4 luminance macroblock and an 8×8 luminance macroblock, said computation control unit controls said third processing unit to execute the first operation thereof, and controls said second processing unit to execute one of the first and third operations thereof according to the sequence in which the pixels of the reference block are outputted, said computation control unit further controlling said first processing unit to execute the second operation thereof.

6. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is one of a 4×4 luminance macroblock and an 8×8 luminance macroblock, said computation control unit controls said first processing unit to execute the first operation thereof.

7. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is a 16×16 luminance macroblock, said computation control unit uses the value of the first pixel signal received in each cycle as the pixel value of the macroblock to be predicted.

8. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is a 16×16 luminance macroblock, said computation control unit controls said first processing unit to execute the first operation thereof.

9. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is a 16×16 luminance macroblock, said computation control unit controls said second processing unit to execute the second operation thereof, and controls said first processing unit to execute the first operation thereof.

10. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is a chrominance macroblock, said computation control unit uses the value of the first pixel signal received in each cycle as the pixel value of the macroblock to be predicted.

11. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is a chrominance macroblock, said computation control unit controls said first processing unit to execute the first operation thereof.

12. The prediction module according to claim 1, the data decoded by the entropy decoder including type and size of the macroblock to be predicted, a static image in which the reference block is located, and a motion vector of the reference block, wherein when the reference block is in the same static image as the macroblock to be predicted and the macroblock to be predicted is a chrominance macroblock, said computation control unit controls said second processing unit to execute the second operation thereof, and controls said first processing unit to execute the first operation thereof.

13. The prediction module according to claim 1, the data decoded by the entropy decoder including type and size of the macroblock to be predicted, a static image in which the reference block is located, and a motion vector of the reference block, wherein when the reference block is not in the same static image as the macroblock to be predicted and the macroblock to be predicted is a luminance macroblock, said computation control unit controls said fifth processing unit to execute the second operation thereof, and controls said third processing unit to execute the second operation thereof, said computation control unit further controlling said second processing unit to execute the first operation thereof, and controlling said first processing unit to execute the second operation thereof.

14. The prediction module according to claim 1, the data decoded by the entropy decoder including type and size of the macroblock to be predicted, a static image in which the reference block is located, and a motion vector of the reference block, wherein when the reference block is not in the same static image as the macroblock to be predicted and the macroblock to be predicted is a chrominance macroblock, said computation control unit controls said fifth processing unit to execute the first operation thereof, controls said third processing unit to execute the first operation thereof, and controls said second processing unit to execute the first operation thereof.

15. The prediction module according to claim 1, wherein said computation control unit computes said first, second and fourth output signals by adding an integer value to each of the first, second and fourth output signals and then making a logic right shift.

* * * * *